United States Patent
Kondo et al.

(10) Patent No.: US 7,061,539 B2
(45) Date of Patent: Jun. 13, 2006

(54) INFORMATION SIGNAL PROCESSING DEVICE, INFORMATION SIGNAL PROCESSING METHOD, IMAGE SIGNAL PROCESSING DEVICE, IMAGE DISPLAY COMPRISING THE SAME, AND INFORMATION PROVIDING MEDIUM

(75) Inventors: Tetsujiro Kondo, Tokyo (JP); Wataru Niitsuma, Tokyo (JP); Yasushi Tatehira, Kanagawa (JP); Nobuyuki Asakura, Tokyo (JP); Takuo Morimura, Kanagawa (JP); Kei Hiraizumi, Kanagawa (JP); Takahide Ayata, Kanagawa (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 10/204,687

(22) PCT Filed: Dec. 26, 2001

(86) PCT No.: PCT/JP01/11452

§ 371 (c)(1),
(2), (4) Date: Aug. 23, 2002

(87) PCT Pub. No.: WO02/052538

PCT Pub. Date: Jul. 4, 2002

(65) Prior Publication Data

US 2003/0011707 A1 Jan. 16, 2003

(51) Int. Cl.
*H04N 7/01* (2006.01)

(52) U.S. Cl. .......................................... 348/458; 348/448
(58) Field of Classification Search ................. 348/458, 348/448, 443, 441, 452; 382/276; H04N 7/01, H04N 11/20
See application file for complete search history.

(56) References Cited

U.S. PATENT DOCUMENTS

| | | | | |
|---|---|---|---|---|
| 5,946,044 A | * | 8/1999 | Kondo et al. | 348/458 |
| 6,034,734 A | * | 3/2000 | De Haan et al. | 348/458 |
| 6,057,885 A | * | 5/2000 | Horishi et al. | 348/450 |
| 6,493,023 B1 | * | 12/2002 | Watson | 348/180 |
| 6,509,930 B1 | * | 1/2003 | Hirano et al. | 348/452 |

FOREIGN PATENT DOCUMENTS

| | | |
|---|---|---|
| EP | 0 989 748 | 3/2000 |
| EP | 1 001 353 | 5/2000 |
| JP | 10 313445 | 11/1998 |
| JP | 2000-244876 | 9/2000 |
| JP | 2001-195586 | 7/2001 |

\* cited by examiner

*Primary Examiner*—Michael H. Lee
(74) *Attorney, Agent, or Firm*—Frommer Lawrence & Haug LLP; William S. Frommer

(57) ABSTRACT

The present invention relates to an information signal processor and the like preferable for use in the case where a SD signal is converted into a HD signal. A space class and a movement class are detected from the tap pixel data, which is selectively extracted from the SD signal, correspond to a target position in the HD signal. In a memory bank 135, a coefficient seed data in each class and term selection information are stored. In the coefficient production circuit 136, coefficient data Wi in each class is produced according to a production equation containing the term selected by term selection information, using the coefficient seed data in each class and the values of parameters h, v for image adjustment. In a calculation circuit 127, pixel data at the target position in the HD signal is obtained from the prediction tap data xi and the coefficient data Wi, by use of an estimated equation. The compression of the sizes of the coefficient seed data and the calculator is enabled without lowering calculation accuracy, and the approximate accuracy at a coefficient curved surface is also increased.

23 Claims, 12 Drawing Sheets

FIG. 4

| COUNT ADDRESSES | SELECTED CONTENTS |
|---|---|
| 0, 1, 2, 3 | 1  1  1  h |
| 4, 5, 6, 7 | 1  1  h  h |
| 8, 9, 10, 11 | 1  h  h  h |
| 12, 13, 14, 15 | h  h  h  h |
| 16, 17, 18, 19 | v  1  1  1 |
| 20, 21, 22, 23 | v  1  1  h |
| 24, 25, 26, 27 | v  1  h  h |
| 28, 29, 30, 31 | v  h  h  h |
| 32, 33, 34, 35 | v  v  1  1 |
| 36, 37, 38, 39 | v  v  1  h |
| 40, 41, 42, 43 | v  v  h  h |
| 44, 45, 46, 47 | v  v  v  1 |
| 48, 49, 50, 51 | v  v  v  h |
| 52, 53, 54, 55 | v  v  v  v |

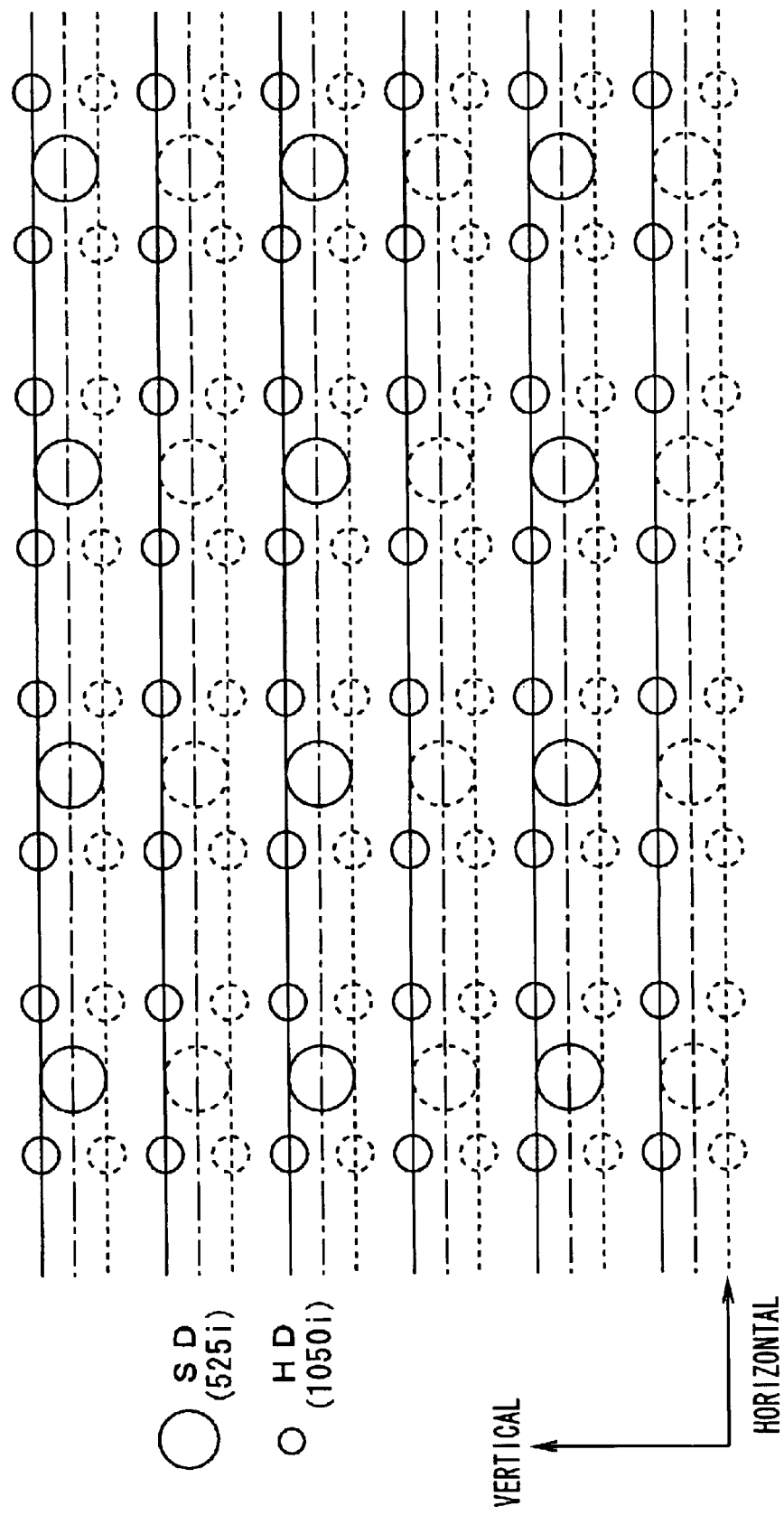

INFORMATION SIGNAL PROCESSING DEVICE, INFORMATION SIGNAL PROCESSING METHOD, IMAGE SIGNAL PROCESSING DEVICE, IMAGE DISPLAY COMPRISING THE SAME, AND INFORMATION PROVIDING MEDIUM

TECHNICAL FIELD

The present invention relates to, for example, an information signal processor, a method for processing an information signal, an image signal processor and an image display apparatus using the same, and an information-providing medium, which are preferable for use in the case where a video signal in NTSC color system is converted into a High-Definition video signal.

More specifically, the present invention relates to an information signal processor and the like wherein, in the case where coefficient data of estimated equation to be used when a first information signal is converted into a second information signal is produced using coefficient seed data, a term of production equation is selected, based on feature amount obtained in relation to the first information signal, thereby compressing the sizes of coefficient seed data and a calculator without lowering the accuracy of operation and increasing approximate accuracy of a coefficient curved surface.

BACKGROUND ART

Conventionally, suggested is a format conversion for converting a 525i signal as a standard definition (SD) signal into a 1050i signal as a high definition (HD) signal. The 525i signal means an image signal in an interlace system consisting of 525 lines. The 1080i signal means an image signal in an interlace system consisting of 1080 lines. FIG. 14 shows a positional relationship between the pixels of the 525i signal and the pixels of the 1080i signal. Herein, large dots are pixels of the 525i signal, and small dots are pixels of the 1080i signal. Solid lines express the positions of pixels in odd fields and broken lines express the positions of pixels in even fields. When the 525i signal is converted into the 1050i signal, it is required to obtain four pixels of 1050i signal in correspondence with one pixel of 525i signal in the respective odd and even fields.

Conventionally, in order to perform the above format conversion, it has been suggested that, when the pixel data of 1050i signal is to be obtained from the pixel data of 525i signal, coefficient data of an estimated equation corresponding to a phase of each pixel of 1050i signal with respect to the pixel of 525i signal is stored in a memory and then, the pixel data of 1050i signal is obtained according to the estimated equation using the stored coefficient data.

According to the method described above where the pixel data of the 1050i signal is obtained from the 525i signal according to the estimated equation, the resolution of an image produced by the 1050i signal is fixed. Therefore, it has been impossible to obtain desirable resolution in accordance with the contents of an image and the like, like conventional adjustments of contrast, sharpness and so on.

DISCLOSURE OF INVENTION

An objective of the present invention is to provide an information signal processor and the like which are capable of continuously and smoothly adjusting, for example, the quality of a image, allows the sizes of coefficient seed data and a calculator to be compressed without lowering the operational accuracy of the coefficient data, and increases approximate accuracy of coefficient curved surface.

An information signal processor according to the present invention for converting a first information signal including a plurality of information data into a second information signal including a plurality of information data, comprises parameter setting means for setting a value of parameter related to the second information signal, first memory means for storing coefficient seed data, the coefficient seed data being coefficient data in production equation for producing coefficient data to be used in an estimated equation and the production equation containing the parameter, term selection means for selecting a term of the production equation, based on a feature amount obtained in relation to the first information signal, coefficient data generation means for generating the coefficient data to be used in the estimated equation corresponding to the set parameter, the coefficient data in the estimated equation being produced according to the production equation using the coefficient seed data stored in the first memory means and a value of the parameter set by the parameter setting means, first data selection means for selecting a plurality of first information data located on the periphery of a target position in the second information signal, based on the first information signal, and calculation means for calculating and obtaining information data at the target position according to the estimated equation using the coefficient data generated in the coefficient data generation means and the plurality of the first information data selected in the first data selection means.

A method for processing an information signal according to the invention for converting a first information signal including a plurality of information data into a second information signal including a plurality of information data, comprises a first step of setting a value of parameter related to the second information signal, a second step of selecting a term of a production equation for producing coefficient data to be used in an estimated equation, the production equation including sad parameter, a third step of generating coefficient data to be used in the estimated equation corresponding to the value of the set parameter, the coefficient data to be used in the estimated equation being produced according to the production equation using the coefficient seed data, the coefficient seed data being coefficient data in the production equation, and the value of the parameter set in the first step, the production equation containing the term selected in the second step, a fourth step of selecting a plurality of first information data located on the periphery of a target position in the second information signal, based on the first information signal, and a fifth step of calculating and obtaining information data at the target position according to the estimated equation using the coefficient data generated in the third step and the plurality of the first information data selected in the fourth step.

Further, an information-providing medium according to the present invention provides a computer program for executing each step in the information signal processing method described above.

An image signal processor according to the present invention for converting a first image signal including a plurality of pixel data into a second image signal including a plurality of pixel data, comprises parameter setting means for setting a value of parameter related to the second image signal, memory means for storing coefficient seed data, the coefficient seed data being coefficient data in production equation for producing coefficient data to be used in an estimated equation, and the production equation containing the parameter, term selection means for selecting a term of the production equation, based on a feature amount obtained in relation to the first image signal, coefficient data generation means for generating the coefficient data to be used in the estimated equation corresponding to the set parameter, the coefficient data in the estimated equation being produced according to the production equation using the coefficient seed data stored in the memory means and a value of the parameter set by the parameter setting means, the production equation containing the term selected by the term selection means, data selection means for selecting a plurality of pixel data located on the periphery of a target position in the second image signal, based on the first image signal, and calculation means for calculating and obtaining pixel data at the target position according to the estimated equation using the coefficient data generated in the coefficient data generation means and the plurality of the pixel data selected in the data selection means.

An image display apparatus according to the present invention comprises image signal input means for inputting a first image signal including a plurality of pixel data, image signal processing means for converting the first image signal input by the image signal input means into a second image signal including a plurality of pixel data, and then for transmitting the resultant second image signal, image display means for displaying an image produced by the second image signal transmitted from the image signal processing means onto an image display element, and parameter setting means for setting a value of parameter relates to the second image signal. The image signal processing means includes first memory means for storing coefficient seed data, the coefficient seed data being coefficient data in production equation for producing coefficient data to be used in an estimated equation and the production equation containing the parameter, term selection means for selecting a term of the production equation, based on a feature amount obtained in relation to the first image signal, coefficient data generation means for generating the coefficient data to be used in the estimated equation corresponding to the set parameter, the coefficient data in the estimated equation being produced according to the production equation using the coefficient seed data stored in the first memory means and a value of the parameter set by the parameter setting means, the production equation containing the term selected in the term selection means, first data selection means for selecting a plurality of first pixel data located on the periphery of a target position in the second image signal, based on the first image signal, and calculation means for calculating and obtaining pixel data at the target position according to the estimated equation using the coefficient data generated in the coefficient data generation means and the plurality of the pixel data selected in the first data selection means.

According to the present invention, a parameter related to the second information signal is set. For example, the parameter determines the quality of output obtained from the second information signal. For example, if the information signal is an image signal, the quality of image such as resolution is decided by the value of parameter; if the information signal is a sound signal, the quality of sound is determined by the value of parameter. Further, for example, the parameter is phase information about the position of information data of the second information signal with respect to the position of information data of the first information signal. This phase information changes when there is a change in the format or the size of the second information signal.

Further, a plurality of first information data located on the periphery of the target position in the second information is selected, based on the first information signal. Then, the information data of the target position is obtained in correspondence with the value of the set parameter. Specifically, coefficient seed data, which is coefficient data in the production equation for producing coefficient data to be used in an estimated equation, is stored in a memory. By use of the stored coefficient seed data and the value of the set parameter, coefficient data of the estimated equation corresponding to the value of the set parameter is produced. Then, information data of the target position is produced according to the estimated equation using the produced coefficient data and the plurality of first information data.

Herein, as described above, a term of the production equation for producing the coefficient data of the estimated equation is selected, based on the feature amount obtained in relation to the first information signal. For example, a plurality of second information data located on the periphery of the target position in the second information signal is selected, based on the first information signal. A class including the information data at the target position detected based on the plurality of second information data is set as a feature amount.

As described above, when the coefficient data of the estimated equation to be used when the first information signal is converted into the second information signal is produced using the coefficient seed data, the term of the generation equation is selected, based on the feature amount obtained in relation to the first information signal. In this manner, it becomes possible to compress the sizes of the coefficient seed data and the calculator without lowering the accuracy of operation, as well as to increase the approximate accuracy of the coefficient curved surface.

When a sum of the coefficient data produced using the coefficient seed data is obtained, and the information data of the target position produced according to the estimated equation as has been described above is normalized with dividing it by the obtained sum, thereby removing level fluctuation of the information data of the target position caused by rounding error occurred when the coefficient data of the estimated equation is obtained in the production equation using the coefficient seed data.

BRIEF DESCRIPTION OF THE DRAWINGS

FIG. 4 is a diagram showing a corresponding relationship between count addresses and selected contents;

FIG. 14 is a diagram for illustrating a positional relationship of the pixels between 525i signal and 1050i signal.

BEST MODE FOR CARRYING OUT THE INVENTION

Figure 1:
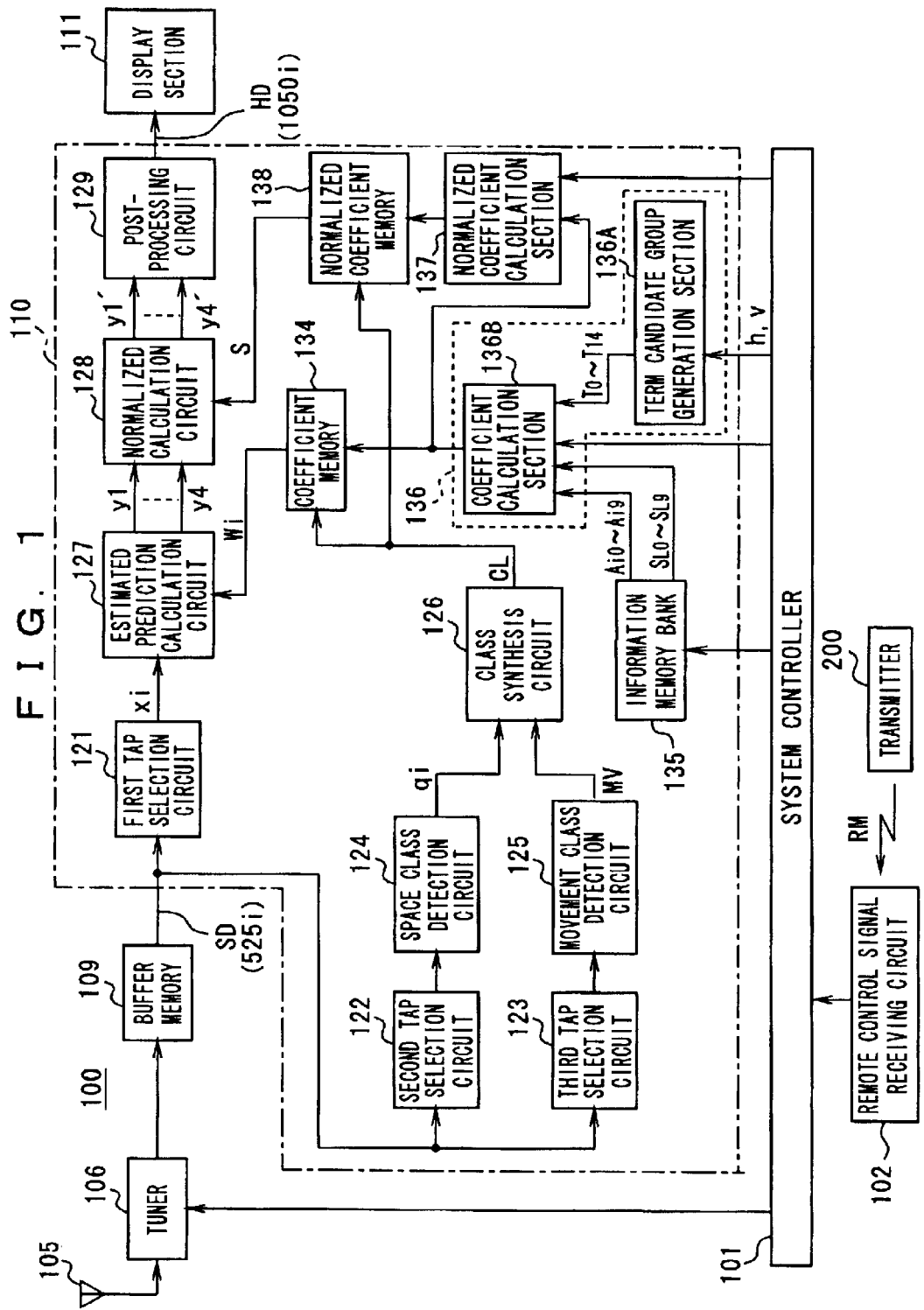
FIG. 1 is a block diagram showing a configuration of television receiver as an embodiment.

Hereinafter, embodiments of the present invention will be described with reference to drawings. FIG. 1 shows a configuration of television receiver 100 as an embodiment. The television receiver 100 receives a 525i signal from a broadcast signal as the SD signal and converts the 525i signal into a 1080i signal as the HD signal so as to display an image by this 1080I signal.

The television receiver 100 comprises a system controller 101 with a microcomputer for controlling operations of the entire system, and a remote control signal receiving circuit 102 for receiving a remote control signal. The remote control signal receiving circuit 102 is connected to the system controller 101, and it is constituted so as to receive a remote control signal RM from a remote control transmitter 200 in accordance with the user operation and to supply an operation signal corresponding to the received signal RM to the system controller 101.

The television receiver 100 also comprises a receiving antenna 105, a tuner 106 for receiving a broadcast signal (RF modification signal) captured by the receiving antenna 105, and performing processing such as a channel selection, a middle frequency amplification, and a wave detection so as to obtain the SD signal (525i signal), and a buffer memory 109 for temporarily storing the SD signal output from the tuner 106.

The television receiver 100 further comprises an image signal processing section 110 for converting the SD signal (525i signal) temporarily stored in the buffer memory 109 to the HD signal (1080i signal), and a display section 111 for displaying an image produced by the HD signal received from the image signal processing section 110. The display section 111 is constituted by, for example, a display apparatus such as a cathode-ray tube (CRT) display, a liquid crystal display (LCD).

An operation of the television receiver 100 shown in FIG. 1 will be described.

The SD signal (525i signal) transmitted from the tuner 106 is supplied to the buffer memory 109, which temporarily stores it. The SD signal temporarily stored in the buffer memory 109 is supplied to the image signal processing section 110, which converts it to the HD signal (1050i signal). Specifically, in the image signal processing section 110, pixel data constituting the HD signal (hereinafter, referred to as "HD pixel data") is obtained from the pixel data constituting the SD signal (hereinafter, referred to as "SD pixel data"). The HD signal transmitted from the image signal processing section 110 is supplied to the display section 111, which displays an image produced by the supplied HD signal on the screen of the display section 111.

Although not described in the above, the user can continuously and smoothly adjust the horizontal and vertical resolutions of the image displayed on the screen of the display section 111 as described above through operations of the remote control transmitter 200. In the image signal processing section 110, the HD pixel data is calculated in an estimated equation, which will be described later. As coefficient data in the estimated equation, data corresponding to parameters h, v for deciding the horizontal and vertical resolutions adjusted by the user through operations of the remote control transmitter 200 is produced according to a production equation containing these parameters h, v, and is used. Due to this procedure, the horizontal and vertical resolutions of the image produced by the HD signal transmitted from the image signal processing section 110 result in a correspondance with the adjusted parameters h, v.

Next, details of the image signal processing section 110 will be described. The image signal processing section 110 includes first to third tap selection circuits 121 to 123 each for selectively extracting a plurality of the SD pixel data located on the periphery of a target position in the HD signal (1050i signal) from the SD signal (525i signal) stored in the buffer memory 109, and then transmitting them.

The first tap selection circuit 121 selectively extracts data of the SD pixel for use in prediction (hereinafter, referred to as "prediction tap"). The second tap selection circuit 122 selectively extracts data of the SD pixel for use in class sort corresponding to the distribution pattern of the levels of SD pixel data (hereinafter, referred to as "space class tap"). The third tap selection circuit 123 selectively extracts data of the SD pixel for use in class sort corresponding to movements (hereinafter, referred to as "movement class tap"). Where the space class is determined using the SD pixel data belonging to the plural fields, this space class also contains information about movements.

The image signal processing section 110 also includes a space class detection circuit 124 for detecting a distribution pattern of levels of data of space class tap (SD pixel data) selectively extracted in the second tap selection circuit 122, and detecting a space class based on the distribution pattern of the levels so as to transmit information about the class.

The space class detection circuit 124 performs an operation such that, for example, the SD pixel data is compressed from 8 bit-data into 2 bit-data. Then, the space class detection circuit 124 transmits the compressed data each corresponding to the SD pixel data as class information of space class. In this embodiment, data compression is performed according to an adaptive dynamic range coding (ADRC) method. Alternative to ADRC, prediction coding such as differential pulse code modulation (DPCM), vector quantization (VQ) and the like may be also employed as a method for compressing information.

Originally, ADRC is an adaptive re-quantization method, which has been developed for use in high performance coding for video tape recorder (VTR). The ADRC is also preferable to a case used in the data compression described above, because this method is capable of effectively expressing a local pattern of a signal level in a short language. In the case of employing ADRC, defining the maximum value of the space class tap data (SD pixel data) as MAX, the minimum value thereof as MIN, a dynamic range of the space class tap data as DR (=MAX−MIN+1), and re-quantized bit number as P, a re-quantized code qi as compressed data is obtained from an operation in following Equation (1) as to each SD pixel data ki as space class tap data.

$$q_i = [(k_i - MIN + 0.5) 0.2^P / DR] \qquad (1)$$

In Equation (1), the portion enclosed with [ ] means truncation processing. When there are SD pixel data in the number of Na, i is 1 to Na.

The image signal processing section 110 also includes an movement class detection circuit 125 for detecting a movement class for mainly expressing the degree of movement, from the movement class tap data (SD pixel data) selectively extracted in the third tap selection circuit 123, and then transmitting the class information thereof.

In the movement class detection circuit 125, a differential between frames is calculated from the movement class tap data (SD pixel data) mi, ni, selectively extracted in the third tap selection circuit 123. Then, a threshold value processing is performed on an average value of the absolute values of differentials so that the movement class, which is an index of movement, can be detected. Specifically, in the movement class detection circuit 125, an average value AV of the absolute values of differentials is calculated in following Equation (2).

$$AV = \frac{\sum_{i=1}^{Nb} |mi - ni|}{Nb} \quad (2)$$

When six SD pixel data m1 to m6 and six SD pixel data n1 to n6 located in the immediately preceding frame are extracted as class tap data, for example, in the third tap selection circuit 123, Nb in the Equation (2) is 6.

In the movement class detection circuit 125, the average value AV calculated as described above is compared with one or a plurality of threshold values so that class information MV about movement class can be obtained. For example, when three threshold values th1, th2, th3 (th1<th2<th3) are prepared and four movement classes are to be detected, MV is set to 0 when AV≦th1; MV is set to 1 when th1<AV≦th2; MV is set to 2 when th2<AV≦th3; and MV is set to 3 when th3<AV.

The image signal processing section 110 also includes a class synthesis circuit 126 for obtaining a class code CL showing a class including the pixel (target pixel) of the HD signal (1050i signal) to be produced, based on the re-quantized code qi as class information about the space class received from the space class detection circuit 124 and the class information MV about the movement class received from the movement class detection circuit 125.

In the class synthesis circuit 126, the class code CL is calculated in following Equation (3).

$$CL = \sum_{i=1}^{Na} qi(2^P)^{j-1} + MV \cdot (2^P)^{Na} \quad (3)$$

In the Equation (3), Na shows the number of space class tap data (SD pixel data), and P shows the re-quantized bit number in the ADRC method.

The image signal processing section 110 also includes a coefficient memory 134. The coefficient memory 134 stores the coefficient data of the estimated equation to be used in an estimated prediction calculation circuit 127, which will be described later, per class. The coefficient data is information for converting the SD signal (525i signal) into the HD signal (1050i signal). The coefficient memory 134 receives the class code CL from the class synthesis circuit 126 described above as read address information. Coefficient data corresponding to the class code CL is read out of the coefficient memory 134, and the read coefficient data is supplied to the estimated prediction calculation circuit 127.

The image signal processing section 110 also includes an information memory bank 135. In the information memory bank 135, coefficient seed data in each class is stored beforehand. The coefficient seed data is coefficient data in the production equation for producing coefficient data to be stored in the aforementioned coefficient memory 134. Further, the information memory bank 135 previously stores term selection information in the production equation for each class. The number of coefficient seed data for the aforementioned each class corresponds to the number of terms to be selected by the aforementioned term selection information.

As described above, when the 525i signal is converted into the 1050i signal, it is required to obtain four pixels of the 1050i signal in correspondence with one pixel of the 525i signal in the respective odd and even fields. Therefore, the coefficient seed data for each class is constituted by coefficient seed data corresponding to four pixels within a pixel block in the unit of 2×2 which constitutes the 1050i signal in the respective odd and even fields. The four pixels within the pixel block in the unit of 2×2 and the pixels of the 525i signal have phase relation that is different from each other.

In the estimated prediction calculation circuit 127, which will be described later, HD pixel data y to be produced is calculated according to following Equation (4) from prediction tap data (SD pixel data) xi and the coefficient data Wi read out of the coefficient memory 134.

$$y = \sum_{i=1}^{n} Wi \cdot xi \quad (4)$$

When the number of the prediction taps to be selected in the first tap selection circuit 121 is 10, n in the Equation (4) is 10.

In this embodiment, following Equation (5) is used as a basic production equation for producing the coefficient data Wi (i=1 to n) in the estimated equation for each class.

$$Wi = w_{i,0} + w_{i,1}h + w_{i,2}h^2 + w_{i,3}h^3 + \\ w_{i,4}h^4 + w_{i,5}v + w_{i,6}hv + w_{i,7}h^2v + w_{i,8}h^3v + w_{i,9}v^2 + \\ w_{i,10}hv^2 + w_{i,11}h^2v^2 + w_{i,12}v^3 + w_{i,13}hv^3 + w_{i,14}hv^4 \quad (5)$$

The coefficnet data Wi in the estimated equation for each class is produced by the production equation constituted by the term selected among terms constituting the basic production equation (constituted by 10 terms at the maximum). In the information memory bank 135, the coefficient seed data, which is the coefficient data in the production equation constituted by thus-selected terms, is stored per class. In the information memory bank 135, the term selection information is also stored per class. The method for producing the coefficient seed data and the term selection information will be described later.

The image signal processing section 110 also includes a coefficient production circuit 136 for producing the coefficient data Wi (i=1 to n) in the estimated equation corresponding to the values of parameters h, v per class, according to the production equation constituted by the selected term using the coefficient seed data for each class and the values of parameters h, v. The coefficient production circuit 136 includes an term candidate group generation section 136A and a coefficient calculation section 136B.

Figure 2:
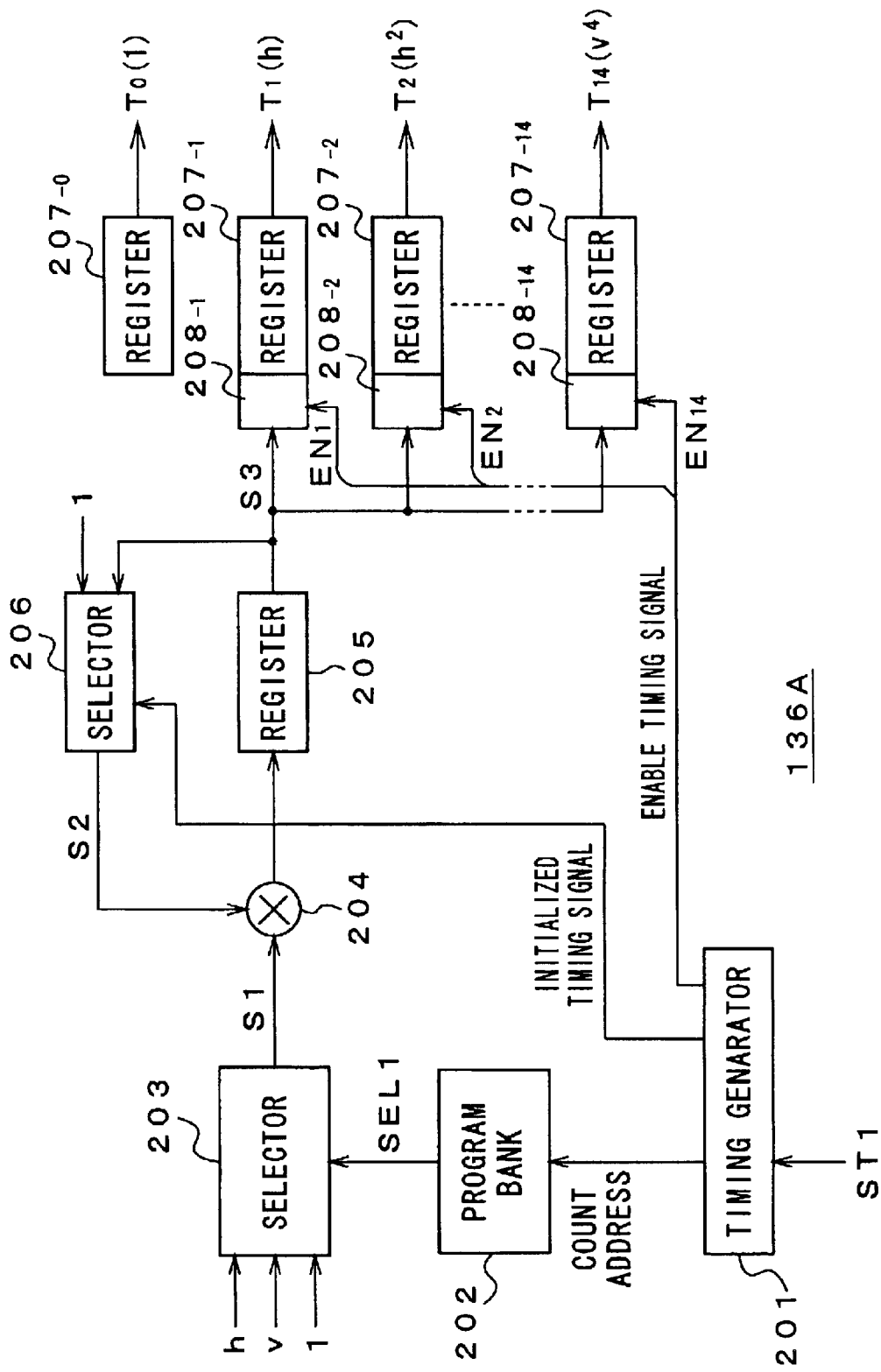
FIG. 2 is a block diagram showing an exemplary configuration of a term candidate group generating section.

The term candidate group generation section 136A will be described. The term candidate group generation section 136A calculates the portion excluding the coefficients of each term in the aforementioned basic production equation (Equation (5)), by use of the values of parameters h, v, so as to generate 15 term candidates $T_0$ to $T_{14}$. FIG. 2 shows an exemplary configuration of the term candidate group generation section 136A.

The term candidate group generation section 136A includes a timing generator 201 for generating various timing signals based on a start signal ST1, a program bank 202 for generating a selection signal SEL1 based on the count address received from the timing generator 201; and a selector 203 for selectively transmitting any one of the parameters h, v, and an integer constant 1 with reciving the parameters h, v and the integer constant 1, based on the selection signal SEL1 received from the program bank 202.

Figure 3:
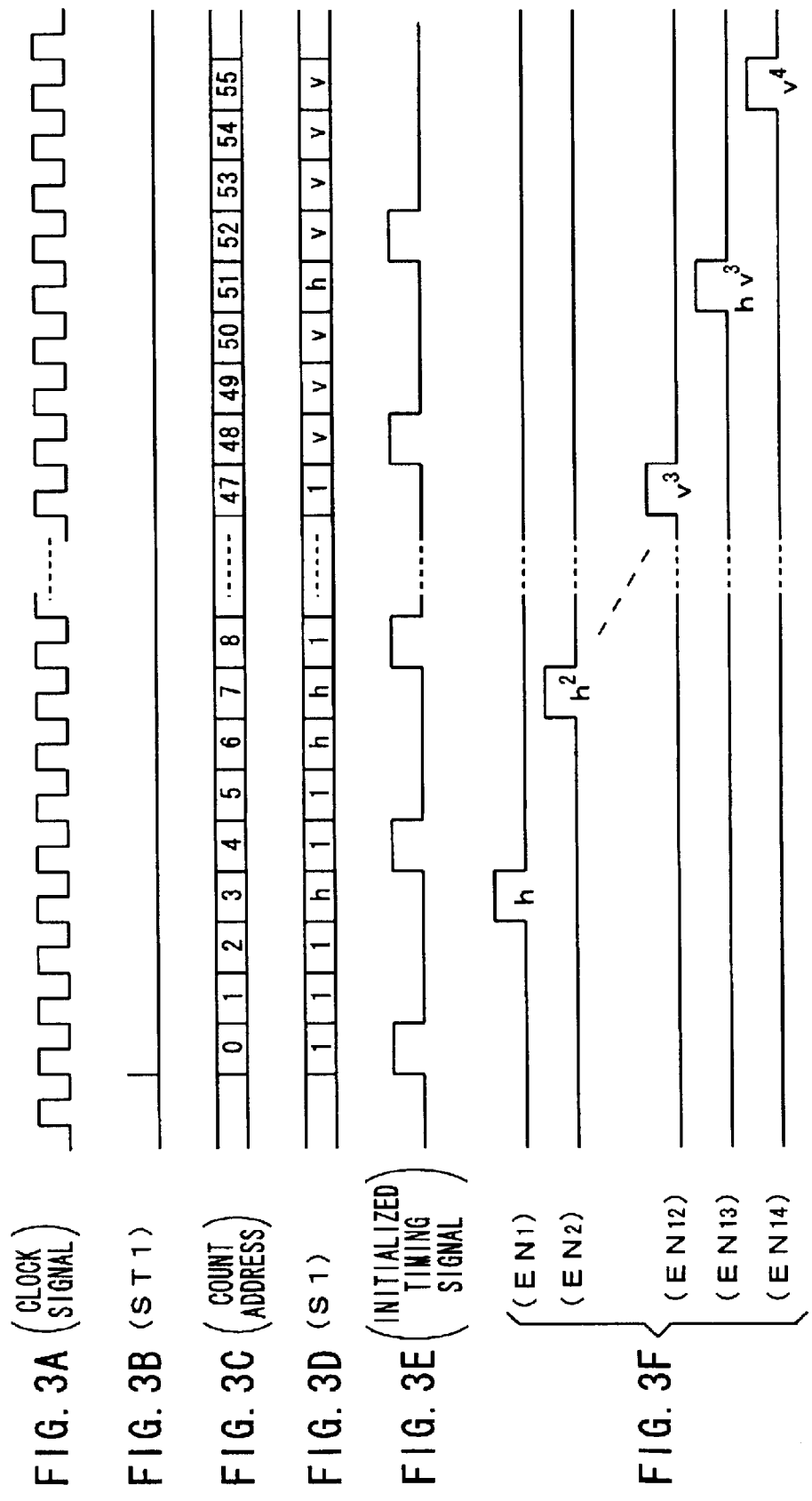
FIGS. 3A to 3F are timing charts each for illustrating operations of a term candidate group generating section.

Herein, after the start signal ST1 is supplied from the timing generator 201 as shown in FIG. 3B, count addresses are generated as shown in FIG. 3C in synchronization with a clock signal shown in FIG. 3A. Then, an output S1 can be obtained from the selector 203 as shown in FIG. 3D. FIG. 4 shows a corresponding relationship between the count addresses and the contents selected by the selector 203.

The term candidate group generation section 136A also includes a multiplier 204 for multiplying the output S1 from the selector 203, a register 205 for storing the results of multiplication performed by the multiplier 204, and a selector 206 for selectively transmitting either the results of multiplication or the integer 1 with receiving the results of multiplication stored in the register 205 or the integer constant 1. The output S2 from the selector 206 is supplied to the multiplier 204. The selector 206 receives an initialized timing signal, which is supplied from the timing generator 201, as shown in FIG. 3E. As a result of this, the integer constant 1 is selectively transmitted from the selector 206 every time when the count address becomes a multiple of 4 such as 0, 4, 8, so as to initialize the multiplication. If the count address is not a multiple of 4, the selector 206 selectively transmits the output S3 of the register 205.

The term candidate group generation section 136A also includes a register $207_{-0}$ for holding a term candidate $T_0$ which excludes parameters h, v, that is, for holding 1, registers $207_{-1}$ to $207_{-14}$ each for transmitting the item candidates $T_1$ to $T_{14}$, and enablers $208_{-1}$ to $208_{-14}$ for controlling the registers $207_{-1}$ to $207_{-14}$ whether or not they store the output S3 of the register 205. Each of the enablers $208_{-1}$ to $208_{-14}$ receives enable signals $EN_1$ to $EN_{14}$ from the timing generator 201 as shown in FIG. 3F. As a result of this, the registers $207_{-1}$ to $207_{-14}$ are sequentially turned into a state where writing is enabled every time when the count address becomes a multiple of 4, and the output S3 of the register 205 is written therein.

An operation of the term candidate group generation section 136A shown in FIG. 2 will be described. When a start signal ST1 (FIG. 3B) is supplied from the system controller 101 (see FIG. 1), an count address (FIG. 3C) is generated in synchronization with a clock signal (FIG. 3A). Then, a selection signal SEL1 is supplied to the selector 203 from the program bank 202 in correspondence with the count addresses, and the parameters h, v or the integer constant 1 (FIG. 3D) is selectively extracted from the selector 203.

In addition, the timing generator 201 supplies the initialized timing signal (FIG. 3E) to the selector 206, which extracts the integer constant 1 instead of the output of the register 205 every time when the count address becomes a multiple of 4. As a result, the multiplication is initialized every time when the count address becomes a multiple of 4.

Then, the enablers $208_{-1}$ to $208_{-14}$ receive enable signals $EN_1$ to $EN_{14}$ (FIG. 3F) from the timing generator 201 respectively. The registers $207_{-1}$ to $207_{-14}$ are sequentially turned into a state where writing is enabled every time when the count address becomes a multiple of 4 minus one. As a result, in the registers $207_{-1}$ to $207_{-14}$, every fourth value of multiplication selectively extracted by the selector 203 is sequentially written.

Due to this, the registers $207_{-1}$ to $207_{-14}$ hold and transmit term candidates $T_1$ to $T_{14}$ corresponding to the second to fifteenth terms of the basic production equation shown in the Equation (5). As described above, the register $207_{-0}$ holds the term candidate $T_0$ corresponding to the first term of the basic production equation shown in the Equation (5) beforehand, and transmits the term candidate $T_0$ together with the aforementioned term candidates $T_1$ to $T_{14}$.

Figure 5:
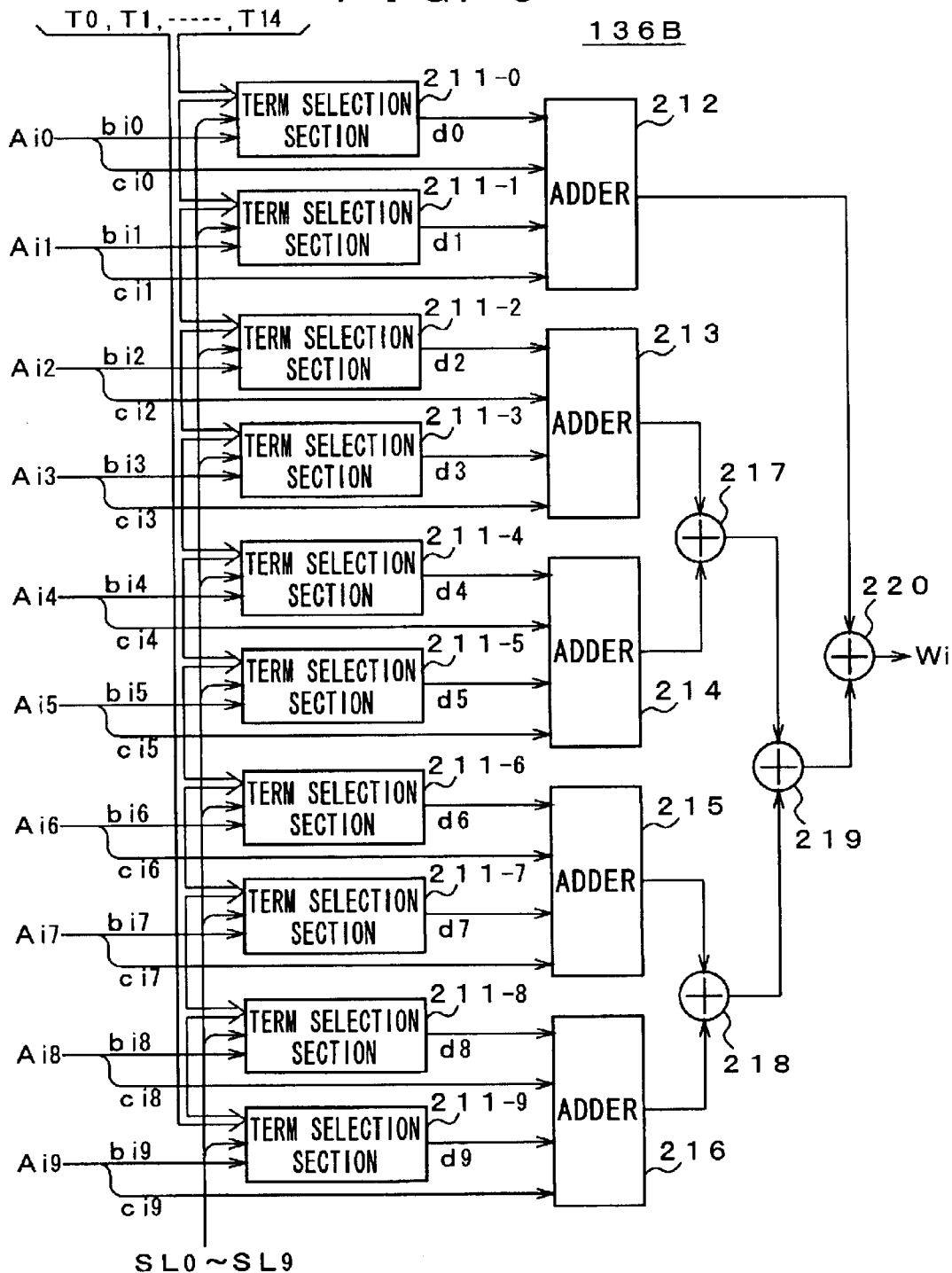
FIG. 5 is a block diagram showing an exemplary configuration of a coefficient operating section.

A coefficient calculation section 136B will be described. The coefficient calculation section 136B selects a term, for each class, from the term candidates $T_0$ to $T_{14}$ received from the aforementioned term candidate group generation section 136A, according to the term selection information $SL_0$ to $SL_9$ read out of the information memory bank 135. Then, the coefficient calculation section 136B calculates coefficient data Wi (i=1 to n) of the estimated equation according to the production equation constituted by the selected term using the coefficient seed data $A_{i0}$ to $A_{i9}$ read out of the information memory bank 135. FIG. 5 shows an exemplary configuration of the coefficient calculation section 136B.

The coefficient calculation section 136B includes term selection sections $211_{-0}$ to $211_{-9}$ for selecting a necessary term from 15 term candidates $T_0$ to $T_{14}$. The term selection sections $211_{-0}$ to $211_{-9}$ are controlled to select any one of the term candidates $T_0$ to $T_{14}$, or to select neither one of them. If the number of terms to be selected is less than 10, there is a term selection section which selects neither one of the term candidates $T_0$ to $T_{14}$.

The term selection sections $211_{-0}$ to $211_{-9}$ receives fixed point sections $b_{i0}$ to $b_{i9}$ of the coefficient seed data $A_{i0}$ to $A_{i9}$ in a floating-point scale. As described above, the fixed point section of the coefficient seed data to be supplied to the term selection section which selects neither one of the term candidates $T_0$ to $T_{14}$ is set to 0.

Figure 6:
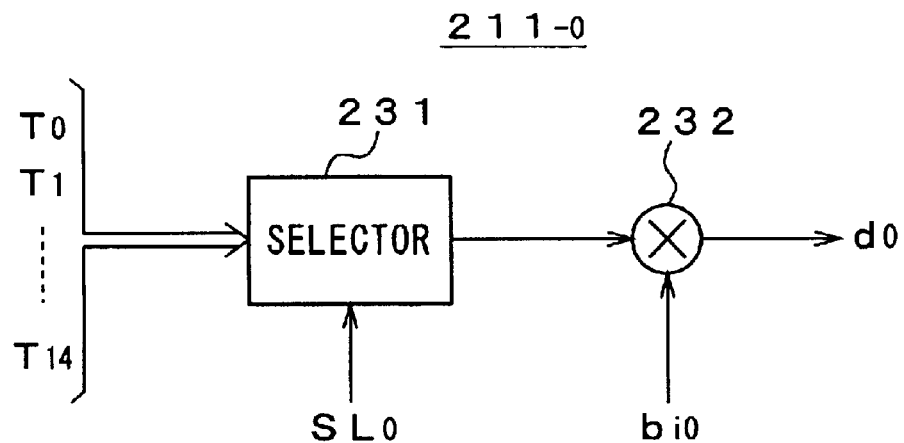
FIG. 6 is a block diagram showing an exemplary configuration of a term selecting section.

FIG. 6 shows an exemplary configuration of the term selection section $211_{-0}$. The term selection section $211_{-0}$ includes a selector 231 for selectively extracting a predetermined term from the term candidates $T_0$ to $T_{14}$, based on the term selection information $SL_0$, and a multiplier 232 for multiplying the output of the selector 231 by the fixed point section $b_{i0}$. If neither one of the term candidates $T_0$ to $T_{14}$ is selected in the term selection section $211_{-0}$, the integer constant 1 is transmitted from the selector 231. In this case, because the output of the selector 231 is multiplied with 0 in the multiplier 232, the output $d_0$ of the term selection section $211_{-0}$ becomes 0. The term selection sections $211_{-1}$ to $211_{-9}$ have the same configuration as the term selection section $211_{-0}$, and their detailed descriptions will be omitted.

Returning to FIG. 5, the coefficient calculation section 136B also includes an adder 212 for adding up the outputs $d_0$, $d_1$ of the term selection sections $211_{-0}$, $211_{-1}$, an adder 213 for adding up the outputs $d_2$, $d_3$ of the term selection sections $211_{-2}$, $211_{-3}$, an adder 214 for adding up the outputs $d_4$, $d_5$ of the term selection sections $211_{-4}$, $211_{-5}$, an adder 215 for adding up the outputs $d_6$, $d_7$ of the term selection sections $211_{-6}$, $211_{-7}$, and an adder 216 for adding up the outputs $d_8$, $d_9$ of the term selection sections $211_{-8}$, $211_{-9}$.

The adder 212 receives index number sections $c_{i0}$, $c_{i1}$ of the coefficient seed data $A_{i0}$, $A_{i1}$.

The adder 213 receives index number sections $c_{i2}$, $c_{i3}$ of the coefficient seed data $A_{i2}$, $A_{i3}$.

The adder 214 receives index number sections $c_{i4}$, $c_{i5}$ of the coefficient seed data $Ai_4$, $Ai_5$.

The adder 215 receives index number sections $c_{i6}$, $c_{i7}$ of the coefficient seed data $Ai_6$, $Ai_7$.

The adder 216 receives index number sections $c_{i8}$, $c_{i9}$ of the coefficient seed data $A_{i8}$, $A_{i9}$.

Figure 7:
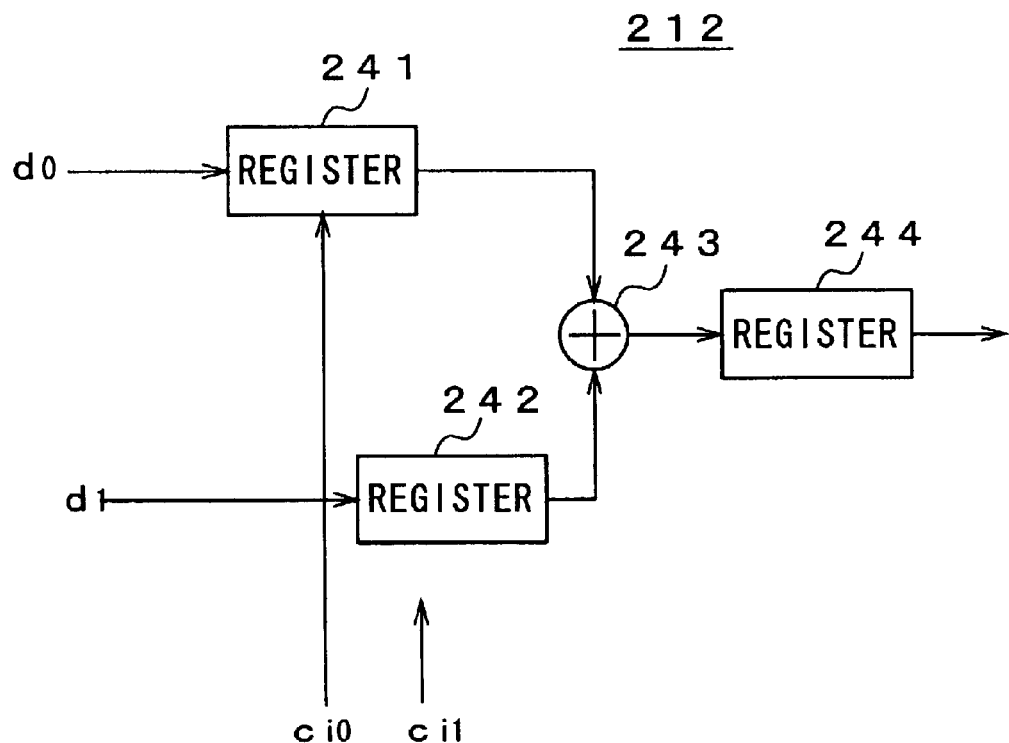
FIG. 7 is a block diagram showing an exemplary configuration of an adding section.

FIG. 7 shows an exemplary configuration of the adder 212. The adder 212 includes a register 241 for performing bit shift on the output $d_0$ of the term selection section $211_{-0}$ based on the index number section $_{ci0}$, to convert the output $d_0$ into a fixed-point scale and hold it, a register 242 for performing bit shift on the output $d_1$ of the term selection section $211_{-1}$ based on the index number section $c_{i1}$, to convert the output d1 into the fixed-point scale and hold it, an adder 243 for adding up the outputs of the registers 241, 242, and a register 244 for holding the added output of the adder 243.

Returning to FIG. 5, the coefficient calculation section 136B also includes an adder 217 for adding up the outputs in the fixed-point scale received from the adders 213, 214, an adder 218 for adding up the outputs in the fixed-point scale received from the adders 215, 216, an adder 219 for adding up the added outputs of the adders 217, 218, and an adder 220 for adding the output of adder 212 to the output of the adder 219 so as to obtain coefficient data Wi.

In the coefficient calculation section 136B shown in FIG. 5, a necessary item is selected from the term candidates $T_0$ to $T_{14}$ by the term selection sections $211_{-0}$ to $211_{-9}$. Then, the term selected by the term selection sections $211_{-0}$ to $211_{-9}$ is multiplied by the corresponding coefficient seed data $A_{i0}$ to $A_{i9}$ in the term selection sections $211_{-0}$ to $211_{-9}$ and the adder 212. Then, the results of the respective multiplications are added up together so as to obtain coefficient data Wi.

The coefficient data Wi (i=1 to n) in each class produced in the aforementioned coefficient production circuit 136 is stored in the aforementioned coefficient memory 134. As described above, the coefficient seed data in each class stored in the information memory bank 135 is constituted by coefficient seed data corresponding to four pixels within a pixel block in the unit of 2×2 in the respective odd and even fields. Therefore, the coefficient data Wi in each class produced in the coefficient production circuit 136 is constituted by coefficient data corresponding to four pixels within a pixel block in the unit of 2×2 in the respective odd and even fields.

The coefficient production circuit 136 produces the coefficient data Wi in each class during, for example, each vertical blanking period. Due to this, even if the values of parameters h, v are changed by the user through operations of the remote control transmitter 200, it is possible to immediately change the coefficient data Wi in each class stored in the coefficient memory 134 into data which corresponds to the values of the changed parameters h, v. As a result, the user can smoothly adjust the resolution.

The image signal processing section 110 also includes a normalized coefficient calculation section 137 for calculating according to following Equation (6) a normalized coefficient S corresponding to the coefficient data Wi (i=1 to n) of each class produced by the coefficient production circuit 136, and a normalized coefficient memory 138 for storing thus-produced normalized coefficient S per class.

$$S = \sum_{i=1}^{n} Wi \quad (6)$$

The normalized coefficient memory 138 receives the class code CL from the aforementioned class synthesis circuit 126 as read address information. The normalized coefficient S corresponding to the class code CL is read out of the normalized coefficient memory 138, and then thus read normalized coefficient S is supplied to a normalized calculation circuit 128, which will be described later.

FIGS. 8A to 8E are timing charts each showing timing relating to the operation for producing the coefficient data Wi and the normalized coefficient S.

Figure 8:
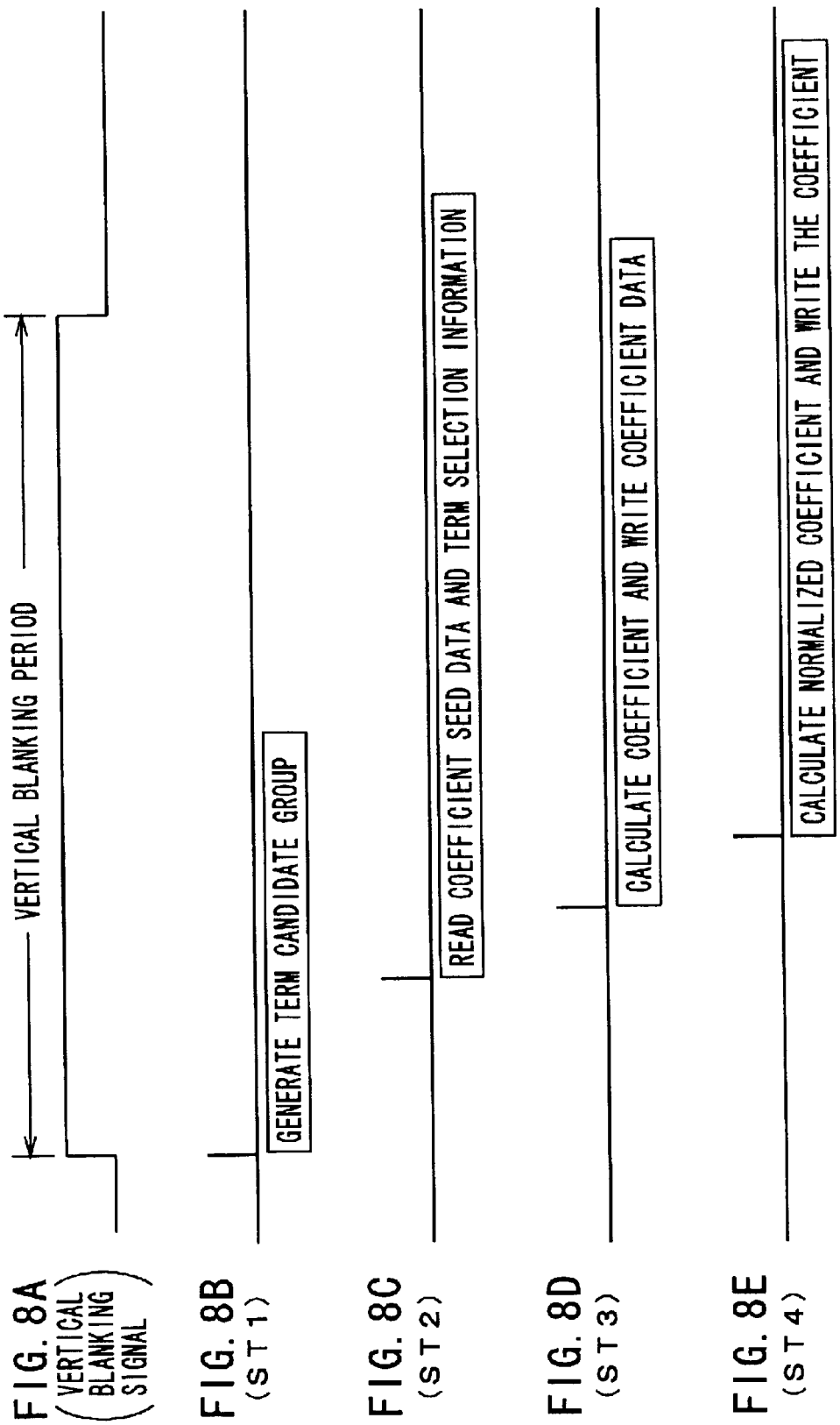
FIGS. 8A to 8E are timing charts for illustrating an operation of producing coefficient data and a normalized coefficient.

FIG. 8A shows a vertical blanking signal. The coefficient data Wi (i=1 to n) in each class and the normalized coefficient S corresponding to the coefficient data Wi are produced during the vertical blanking period. An operation of the term candidate group generation section 136A is started in response to the start signal ST1 shown in FIG. 8B, and the terms candidates $T_1$ to $T_{14}$ are produced by use of the parameters h, v.

After the production of the term candidates $T_1$ to $T_{14}$ is finished and the term candidates $T_0$ to $T_{14}$ are ready for being transmitted from the term candidate group generation section 136A, the reading of the coefficient seed data $A_{i0}$ to $Ai_9$ and the term selection information $SL_0$ to $SL_9$ from the information memory bank 135 starts in response to a start signal ST2 shown in FIG. 8C. After the data and information required for calculating the coefficient data Wi are read, an operation of the coefficient calculation section 136B starts in response to a start signal ST3 shown in FIG. 8D. As a result, the coefficient data Wi of the estimated equation in each class is sequentially calculated, and thus-calculated coefficient data Wi is written into the coefficient memory 134.

In addition, after the coefficient data Wi in a first class is calculated in the coefficient calculation section 136B, an operation of the normalized coefficient operation section 137 starts in response to a start signal ST4 shown in FIG. 8E. As a result, a normalized coefficient S corresponding to the coefficient data Wi (i=1 to n) of the estimated equation in each class is sequentially calculated, and thus-calculated normalized coefficient S is written into the normalized coefficient memory 138.

The image signal processing section 110 also includes an estimated prediction calculation circuit 127 for calculating data of the pixel of the HD signal to be produced (the target pixel), based on the prediction tap data (SD pixel data) xi selectively extracted in the first tap selection circuit 121 and the coefficient data Si read out of the coefficient memory 134.

As described above, when the SD signal (525i signal) is converted into the HD signal (1050i signal), it is required to obtain four pixels of HD signal for one pixel of SD signal. Therefore, the estimated prediction calculation circuit 127 produces pixel data every pixel block in the unit of 2×2 which constitutes the HD signal. Specifically, the estimated prediction calculation circuit 127 receives, from the first tap selection circuit 121, the prediction tap data xi corresponding to four pixels within the unit pixel block (target pixel) and the coefficient data Wi corresponding to the four pixels which constitute the unit pixel block. The four pixel data (HD pixel data) $y_1$ to $y_4$ which constitutes the unit pixel block is calculated separately from each other by the estimated equation of the aforementioned Equation (4).

The image signal processing section 110 also includes a normalized calculation circuit 128 for normalizing with dividing the four pixel data $y_1$ to $y_4$ sequentially received from the estimated prediction calculation circuit 127 by the normalized coefficient S corresponding to the coefficient data Wi (i=1 to n) used in the calculation for the respective four pixel data $y_1$ to $y_4$, the normalized coefficient S being read out of the normalized coefficient calculation section. Although not described above, the coefficient production circuit 136 produces the coefficient data Wi of the estimated equation according to the production equation from the coefficient seed data. However, the produced coefficient data contains a rounding error, and there is no guarantee that the sum of the coefficient data Wi (i=1 to n) is 1.0. Therefore, the data $y_1$ to $y_4$ of each pixel calculated in the estimated prediction calculation circuit 127 involves level fluctuation as a result of rounding error. As described above, the fluctuation can be removed by normalizing them in the normalized calculation circuit 128.

In addition, the image signal processing section 110 also includes a post-processing circuit 129 for processing the four pixel data $y_1'$ to $y_4'$ within the unit pixel block normalized in the normalized calculation circuit 128 and sequentially supplied therefrom, into linear-sequential state, and then transmitting them with a format of 1050i signal.

Next, an operation of the image signal processing section 110 will be described.

In the second tap selection circuit 122, space class tap data (SD pixel data) located on the periphery of the four pixels (target pixels) within the unit pixel block constituting the HD signal to be produced (1050i signal) is selectively extracted from the SD signal (525i signal) stored in the buffer memory 109. Thus-obtained space class tap data is supplied to the space class detection circuit 124. In the space class detection circuit 124, each SD pixel data as the space class tap data is subjected to an ADRC processing so that a re-quantized code qi as class information of the space class (a class sort mainly for the purpose of expressing the waveform in a space) may be obtained (see the Equation (1)).

In addition, in the third tap selection circuit 123, movement class tap data (SD image data) located on the periphery of the four pixels (target pixels) within the unit pixel block constituting the HD signal to be produced (1050i signal) is selectively extracted from the SD signal (525i signal) stored in the buffer memory 109. Thus-obtained movement class tap data is supplied to the space class detection circuit 125. In the movement class detection circuit 125, class information MV about a movement class (a class sort mainly for the purpose of expressing the degree of movement) is obtained from each SD pixel data as movement class tap data.

Thus-obtained movement information MV and the aforementioned re-quantized code qi are supplied to the class synthesis circuit 126. In the class synthesis circuit 126, a class code CL showing a class including data of four pixels (target pixels) within the unit pixel block is obtained from the movement information MV and the re-quantized code qi, as to each unit pixel block constituting the HD signal (1050i signal) to be produced (see the Equation (3)). Then, thus-obtained class code CL is supplied as read address information to the coefficient memory 134 and the normalized coefficient memory 138.

The coefficient production circuit 136 produces coefficient data Wi (i=1 to n) of the estimated equation in each class corresponding to the values of parameters h, v which have been adjusted by the user during, for example, each vertical blanking period, and then the produced data is stored in the coefficient memory 134. In addition, the normalized coefficient calculation section 137 produces normalized coefficient S corresponding to the coefficient data Wi (i=1 to n) in each class produced by the coefficient production circuit 136 as described above, and then the produced normalized coefficient is stored in the normalized coefficient memory 138.

As described above, the class code CL is supplied as read address information to the coefficient memory 134. In this manner, the coefficient data Wi corresponding to the class code CL is read out of the coefficient memory 134 and then thus read coefficient data Wi is supplied to the estimated prediction calculation circuit 127. In addition, in the first tap selection circuit 121, prediction tap data (SD pixel data) located on the periphery of the four pixels (target pixels) within the unit pixel block constituting the HD signal to be produced (1050i signal) is selectively extracted from the SD signal (525i signal) stored in the buffer memory 109. Thus-obtained prediction tap data xi is supplied to the estimated prediction calculation circuit 127.

In the estimated prediction calculation circuit 127, the data (HD pixel data) $y_1$ to $y_4$ of four pixels (target pixels) within the unit pixel block constituting the HD signal to be produced is calculated separately from the prediction tap data (SD pixel data) xi and the coefficient data Wi equivalent to 4 pixels read out of the coefficient memory 134 (see the Equation (4)). The data $y_1$ to $y_4$ of four pixels within the unit pixel block constituting the HD signal and sequentially transmitted from the estimated prediction calculation circuit 127, is supplied to the normalized calculation circuit 128.

As described above, the class code CL is supplied to the normalized coefficient memory 138 as read address information. Out of the normalized coefficient memory 138, read is a normalized coefficient S corresponding to the class code CL, that is, the normalized coefficient S corresponding to the coefficient data Wi which has been used in calculating the HD pixel data $y_1$ to $y_4$ transmitted from the estimated prediction calculation circuit 127. Thus read normalized coefficient S is supplied to the normalized calculation circuit 128. In the normalized calculation circuit 128, the HD pixel data $y_1$ to $y_4$ transmitted from the estimated prediction calculation circuit 127 is normalized with dividing them by their respectively corresponding normalized coefficients S. This removes the level fluctuation of the data $y_1$ to $y_4$ caused by rounding error occurred when the coefficient data of the estimated equation (see the Equation (4)) is obtained according to the production equation (see the Equation (5)) using the coefficient seed data.

The data $y_1'$ to $y_4'$ of four pixels within the unit pixel block, which is normalized in the normalized calculation circuit 128 and sequentially transmitted therefrom, is supplied to the post-processing circuit 129. The post-processing circuit 129 receives the data $y_1'$ to $y_4'$ of four pixels within the unit pixel block, which is sequentially supplied from the normalized calculation circuit 128, turns the data $y_1'$ to $y_4'$ into linear-sequential state, and then transmits it with a format of 1050i signal. In other words, the post-processing circuit 129 transmits 1050i signal as a HD signal.

As described above, in the coefficient production circuit 136, coefficient data Wi (i=1 to n) of the estimated equation corresponding to the values of parameters h, v is produced per class, by use of the coefficient seed data loaded from the information memory bank 135, and the resultant coefficient data Wi is stored into the coefficient memory 134. Then, by use of the coefficient data Wi (i=1 to n) read out of the coefficient memory 134 in correspondence with the class code CL, the HD pixel data y is calculated in the estimated prediction calculation circuit 127. Therefore, the user can continuously and smoothly adjust the image quality along the horizontal and vertical directions of the image obtained by the HD signal, by adjusting the values of parameters h, v. In this case, the coefficient data in each class corresponding to the adjusted values of parameters h, v, is produced and used in the coefficient production circuit 136 every time when the user performs such an adjustment. Consequently, there is no need of a memory for storing a large amount of coefficient data.

Further, as described above, when the coefficient data Wi of the estimated equation in each class is produced by the coefficient production circuit 136 using the coefficient seed data, the term of the production equation is selected per each class. In this manner, it is possible to compress the sizes of the calculator for obtaining the coefficient seed data stored in the information memory bank 135, and of the coefficient data Wi, without lowering the accuracy of calculation.

If a light-weighted term exists in the production equation, a certain weight is taken away from the total gain by this light-weighted term, resulting in lowering an approximate accuracy at a coefficient curved surface. Contrarily in the above-described manner, the selection of the term of the production equation is enabled. As a result, the lighter term in weight can be omitted from the production equation, thereby increasing the approximate accuracy at the coefficient curved surface.

Next, a method for producing coefficient seed data and the term selection information stored in the information memory bank 135 will be described. The coefficient seed data and the term selection information are produced beforehand by learning.

First, an example of a method for producing the coefficient seed data will be described. The description will be made as to an example where coefficient seed data $w_{i0}$ to $w_{i14}$, which is coefficient data in the basic production equation of Equation (5), should be obtained.

Herein, the terms ti (i=0 to 14) are defined as following Equation (7), for the purpose of description:

$$t_0=1;\ t_1=h;\ t_2=h^2;\ t_3=h^3;\ t_4=h^4;\ t_5=v;\ t_6=hv;\ t_7=h^2v;\ t_8=h^3v;\ t_9=v^2;\ t_{10}=hv^2;\ t_{11}=h^2v^2;\ t_{12}=v^3;\ t_{13}=hv^3;\ \text{and}\ t_{14}=v^4 \quad (7)$$

By use of the Equation (7) above, the Equation (5) can be rewritten into Equation (8) as follows.

$$Wi = \sum_{j=0}^{9} w_{ij} \cdot t_i \quad (8)$$

Finally, an undefined coefficient $W_{ij}$ is obtained by learning. Specifically, this is a solution method by use of a least square method where a coefficient value which minimizes a square error is defined per each conversion method and per class using a plurality of SD pixel data and HD pixel data. Defining the number of learning as m, a residual error at k-th learning data ($1 \leq k \leq m$) as $e_k$, and a sum of square errors as E, E is expressed in following Equation (9) by use of the Equations (4) and (5).

$$E = \sum_{k=1}^{m} e_k^2 \quad (9)$$

$$= \sum_{k=1}^{m} [y_k - (W_1 x_{1K} + W_2 x_{2K} + \ldots + W_n x_{nK})]^2$$

$$= \sum_{k=1}^{m} \{y_k - [(t_0 w_{1,0} + t_1 w_{1,1} + \ldots + t_{14} w_{1,14}) x_{1k} + \ldots + (t_0 w_{n,0} + t_1 w_{n,1} + \ldots + t_{14} w_{n,14}) x_{nk}]\}^2$$

$$= \sum_{k=1}^{m} \{y_k - [(w_{1,0} + w_{1,1} h + \ldots + w_{1,14} v^4) x_{1k} + \ldots + (w_{n,0} + w_{n,1} h + \ldots + w_{n,14} v^4) x_{nk}]\}^2$$

Herein, the term $x_{ik}$ shows k-th pixel data at a position of i-th prediction tap of the SD image, and the term $y_k$ shows k-th pixel data of HD image.

In the solution method by use of the least square method, a value of $w_{ij}$ which makes the partial differentiation of the Equation (9) into 0 is obtained. This is expressed by Equation (10) as follows.

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \quad (10)$$

Hereinafter, defining the terms $X_{ipjq}$ and $Y_{ip}$ as shown in following Equations (11) and (12), the Equation (10) can be rewritten into following Equation (13) by use of matrix.

$$X_{i,p,j,q} = \sum_{k=1}^{m} x_{ik} t_p x_{jk} t_q \quad (11)$$

$$Y_{i,p} = \sum_{k=1}^{m} x_{ik} t_p y_k \quad (12)$$

$$\begin{bmatrix} X_{1,0,1,0} & X_{1,0,1,1} & X_{1,0,1,2} & \cdots & X_{1,0,1,14} & X_{1,0,2,0} & \cdots & X_{1,0,n,14} \\ X_{1,1,1,0} & X_{1,1,1,1} & X_{1,1,1,2} & \cdots & X_{1,1,1,14} & X_{1,1,2,0} & \cdots & X_{1,1,n,14} \\ X_{1,2,1,0} & X_{1,2,1,1} & X_{1,2,1,2} & \cdots & X_{1,2,1,14} & X_{1,2,2,0} & \cdots & X_{1,2,n,14} \\ \vdots & \vdots & \vdots & \ddots & \vdots & \vdots & \ddots & \vdots \\ X_{1,14,1,0} & X_{1,14,1,1} & X_{1,14,1,2} & \cdots & X_{1,14,1,14} & X_{1,14,2,0} & \cdots & X_{1,14,n,14} \\ X_{2,0,1,0} & X_{2,0,1,1} & X_{2,0,1,2} & \cdots & X_{2,0,1,14} & X_{2,0,2,0} & \cdots & X_{2,0,n,14} \\ \vdots & \vdots & \vdots & \ddots & \vdots & \vdots & \ddots & \vdots \\ X_{n,14,1,0} & X_{n,14,1,1} & X_{n,14,1,2} & \cdots & X_{n,14,1,14} & X_{n,14,2,0} & \cdots & X_{n,14,n,14} \end{bmatrix} \begin{bmatrix} w_{1,0} \\ w_{1,1} \\ w_{1,2} \\ \vdots \\ w_{1,14} \\ w_{2,0} \\ \vdots \\ w_{n,14} \end{bmatrix} = \begin{bmatrix} Y_{1,0} \\ Y_{1,1} \\ Y_{1,2} \\ \vdots \\ Y_{1,14} \\ Y_{2,0} \\ \vdots \\ Y_{n,14} \end{bmatrix} \quad (13)$$

This equation is generally referred to as a normal equation. The normal equation is solved about $w_{ij}$ by use of a sweeping method (a Gauss-Jordan elimination method) and the like so that the coefficient seed data can be calculated.

Figure 9:
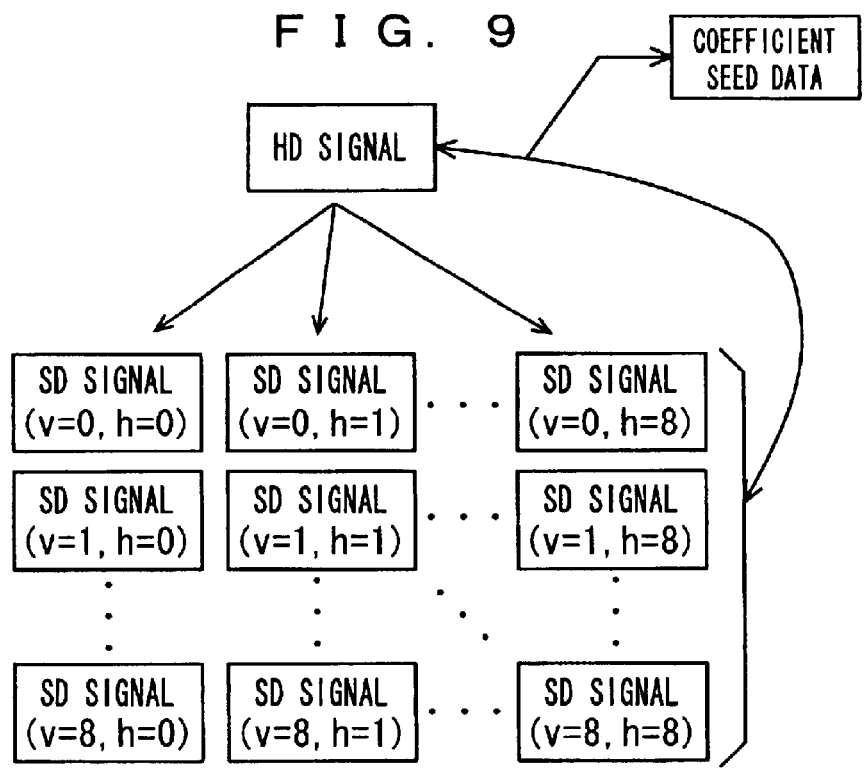
FIG. 9 is a diagram showing an example of concept of a method for producing coefficient seed data.

FIG. 9 shows a concept of the aforementioned method for producing the coefficient seed data. A plurality of SD signals is produced from a HD signal. For example, 81 kinds of SD signals in total are produced with the parameters h, v for varying the horizontal bandpass and vertical bandpass of the filter used at the time of producing the SD signals from the HD signal being varied respectively at 9 levels. Learning is performed between thus-produced plurality of SD signals and the HD signal to produce coefficient seed data.

Figure 10:
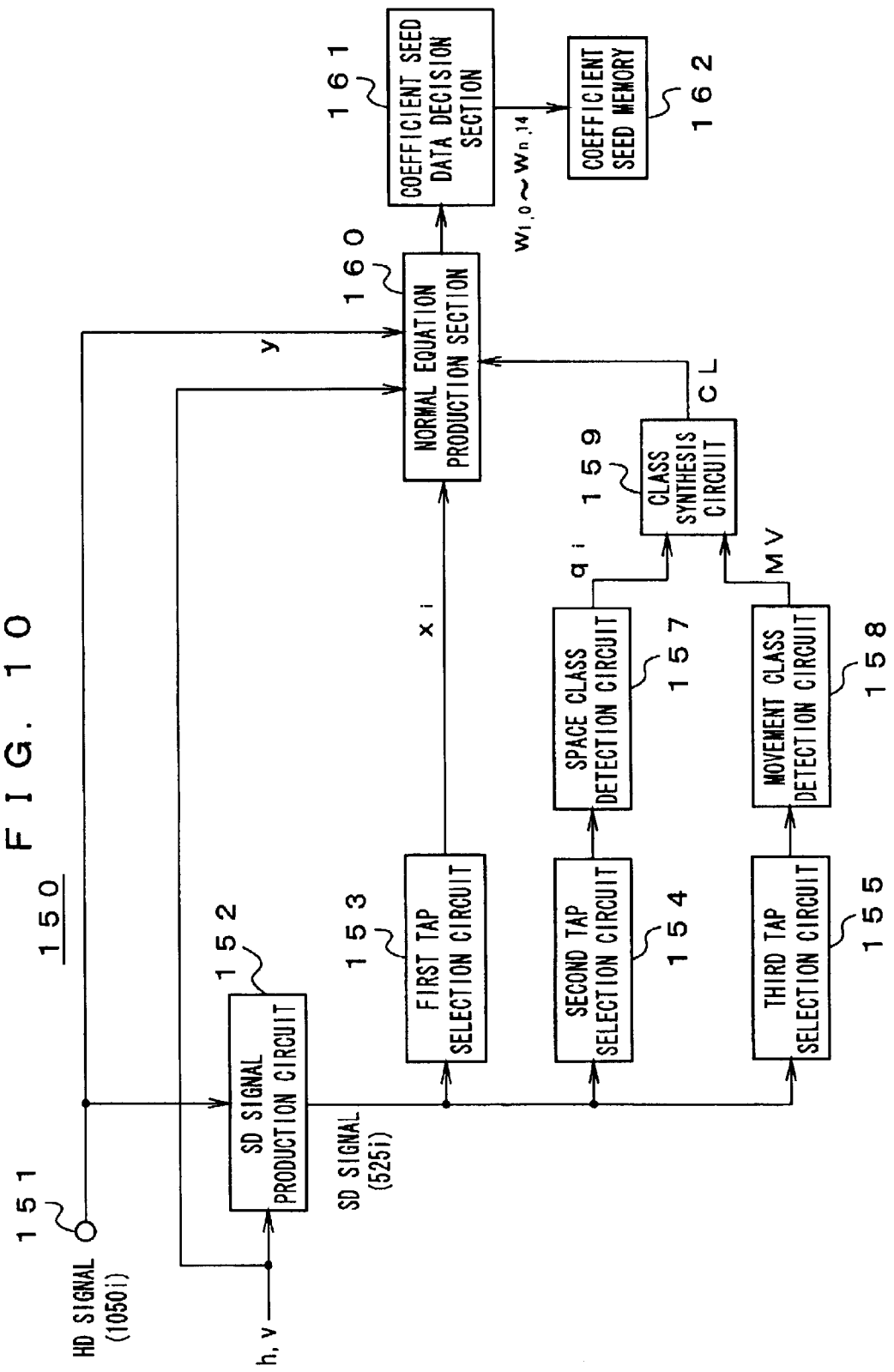
FIG. 10 is a block diagram showing an exemplary configuration of a coefficient seed data generating device.

FIG. 10 shows a configuration of a coefficient seed data production apparatus 150 for producing the coefficient seed data, based on the aforementioned concept.

The coefficient seed data production apparatus 150 includes an input terminal 151 for receiving the HD signal (1050i signal) as a teacher signal, and a SD signal production circuit 152 for performing a thinning-out processing on the HD signal in horizontal and vertical directions so as to obtain the SD signal (525i signal) as a student signal.

The SD signal production circuit 152 receives parameters h, v as control signals. In correspondence with the parameters h, v, the horizontal bandpass and the vertical bandpass of the filter used at the time of producing the SD signals from the HD signal are varied. Herein, some examples of the details of the filter will be described.

Figure 11:
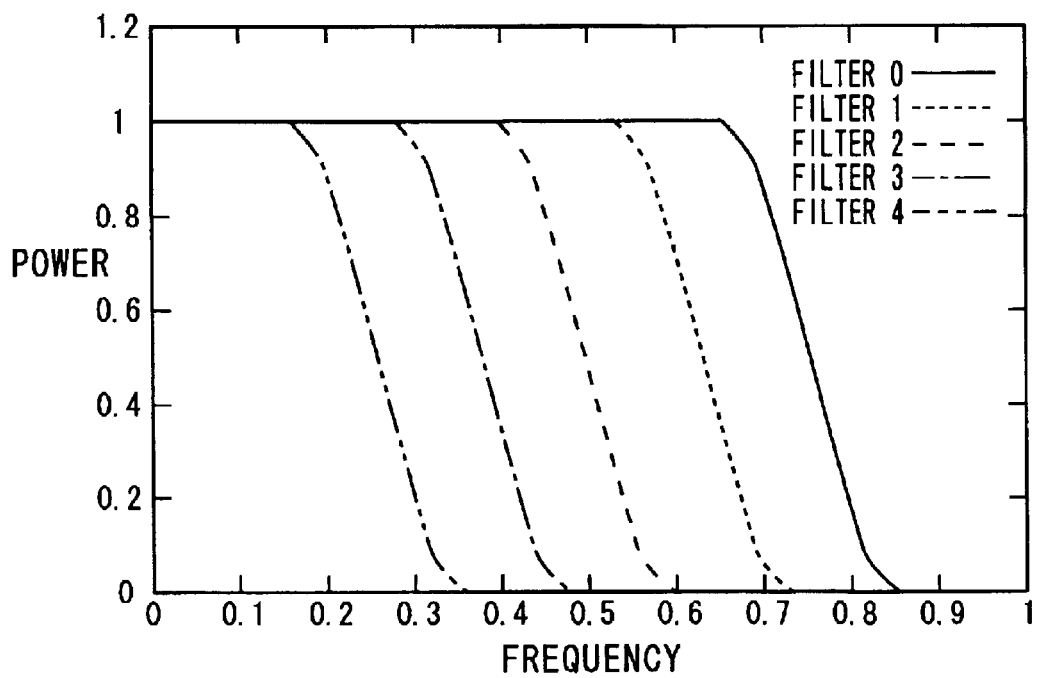
FIG. 11 is a diagram showing an example of frequency characteristic of a bandpass filter.

For example, it is conceivable to constitute the filter by a bandpass filter for restricting a horizontal bandpass and a bandpass filter for restricting a vertical bandpass. In this case, as shown in FIG. 11, a frequency characteristic corresponding to the gradual values of the parameter h or v is designed, and inverse Fourier transform is performed. As a result of this, a one-dimensional filter having a frequency characteristic corresponding to the gradual values of the parameter h or v can be obtained.

In addition, for example, it is conceivable to constitute the filter by one-dimentional Gaussian filter for restricting a horizontal bandpass and one-dimentional Gaussian filter for restricting a vertical bandpass Thus-constructed one-dementional Gaussian filter is expressed by following Equation (14).

$$Out = \frac{1.0}{\sigma\sqrt{2.0\pi}} e^{\frac{-(4.0x-37)^2}{2.0\sigma^2}} \quad (14)$$

In this case, changing the values of standard deviation $\sigma$ gradually in correspondence with the gradual values of parameter h or v allows the one-dimentional Gaussian filter having a frequency characteristic corresponding to the gradual values of parameter h or v to be obtained.

In addition, for example, it is conceivable to constitute the filter by a two-dimensional filter F (h, v) having horizontal and vertical characteristics, which are determined by both the parameters h, v. The method for producing the two-dimensional filter is as follows. Similar to the method for the one-dimensional filter described above, the two-dimensional frequency characteristic corresponding to the gradual values of parameters h, v is designed, and two-dimensional inverse Fourier transform is performed. As a result, a two-dimensional filter having two-dimensional frequency characteristic corresponding to the gradual values of parameters h, v can be obtained.

The coefficient seed data production apparatus 150 also includes first to third tap selection circuits 153 to 155 each for selectively extracting the data of plurality of SD pixels located on the periphery of the target position in the HD signal (1050i signal) from the SD signal (525i signal) received from the SD signal production circuit 152, and then transmits the extracted data. These first to third tap selection circuits 153 to 155 are constituted so as to have the same structure as those of the first to third tap selection circuits 121 to 123 in the image signal processing section 110 described above.

The coefficient seed data production apparatus 150 also includes a space class detection circuit 157 for detecting the distribution pattern of the levels of the space class tap data (SD pixel data) selectively extracted in the second tap selection circuit 154, for detecting a space class based on the distribution pattern of levels, and for transmitting class information thereof. The space class detection circuit 157 is constituted so as to have the same structure as that of the space class detection circuit 124 in the image signal processing section 110 described above. The space class detection circuit 157 transmits, as class information showing the space class, a re-quantized code qi for each SD pixel data as the space class tap data.

The coefficient seed data production apparatus 150 also includes a movement class detection circuit 158 for detecting a movement class mainly showing the degree of movement from the movement class tap data (SD pixel data) selectively extracted in the third tap selection circuit 155, and then for transmitting the class information MV thereof. The movement class detection circuit 158 is constituted so as to have the same structure as that of the movement class detection circuit 125 in the image signal processing section 110 described above. In the movement class detection circuit 158, a differential between frames is calculated from the movement class tap data (SD pixel data) which is selectively extracted in the third tap selection circuit 155. Then, a threshold value processing is performed on an average value of the absolute values of differentials so that the movement class, which is an index of movement, can be detected.

The coefficient seed data production apparatus 150 also includes a class synthesis circuit 159 for obtaining a class code CL showing a class including the pixel data at the target position in the HD signal (1050i signal), based on the re-quantized code qi as class information about the space class received from the space class detection circuit 157 and the class information MV about the movement class received from the movement class detection circuit 158. The class synthesis circuit 159 is also constituted so as to have the same structure as that of the class synthesis circuit 126 in the image signal processing section 110 described above.

The coefficient seed data production apparatus 150 also includes a normal equation production section 160 for producing a normal equation (see the Equation (13)) to be employed for obtaining coefficient seed data $w_{1,0}$ to $w_{n,14}$ for each class, from each HD pixel data y as pixel data at the target position obtained from the HD signal received at the input terminal 151, prediction tap data (SD pixel data ) xi selectively extracted in the first tap selection circuit 153 respectively in correspondence with each HD pixel data y, the class code CL received from the class synthesis circuit 159 respectively in correspondence withy each HD pixel data y, and the parameters h, v.

In this case, one learning data is produced in combination of one HD pixel data y and the prediction tap pixel data in the number of n corresponding to the HD pixel data y. The parameters h, v to be supplied to the SD signal production circuit 152 are sequentially changed so that a plurality of SD signals having gradually-changed horizontal and vertical bandpasses can be sequentially produced. As a result, a normal equation in which a large number of learning data are registered is produced in the normal equation production section 160.

Herein, the coefficient seed data calculated as a result of learning between the HD signal and the SD signals produced from the HD signal by operating the filter having a narrow bandpass is data for obtaining a HD signal with high resolution. Contrarily, the coefficient seed data calculated as a result of learning between the HD signal and the SD signals produced from the HD signals by operating the filter having a wide bandpass is data for obtaining a HD signal with low resolution. Producing a plurality of SD signals sequentially and then registering the learning data as described above allows the coefficient seed data for obtaining a HD signal having continuous resolution to be obtained.

Although not shown in the drawings, when disposing a delay circuit for time adjustment at a preceding stage to the first tap selection circuit 153, the timing of the SD pixel data xi supplied from the first tap selection circuit 153 to the normal equation production section 160 can be adjusted.

The coefficient seed data production apparatus 150 also includes a coefficient data decision section 161 for receiving data of the normal equation produced for each class in the normal equation production section 160, and for solving the normal equation for each class so as to obtain coefficient seed data $w_{1,0}$ to $W_{n,14}$ in each class, and a coefficient seed memory 162 for storing thus-obtained coefficient seed data $w_{1,0}$ to $W_{n,14}$. In the coefficient seed data decision section 161, the normal equation is solved according to a method such as the sweeping so that the coefficient data $w_{1,0}$ to $W_{n,14}$ can be obtained.

An operation of the coefficient seed data production apparatus 150 shown in FIG. 10 will be described. HD signal (1050i signal) is supplied to the input terminal 151 as a teacher signal. Then, the HD signal is subjected to the thinning-out processing in horizontal and vertical directions in the SD signal production circuit 152 so that SD signals (525i signal) can be produced as student signal. In this case, parameters h, v are supplied to the SD signal production circuit 152 as control signals, so that a plurality of SD signal of which horizontal and vertical bandpasses are gradually changed are sequentially produced.

In the second tap selection circuit 154, space class tap data (SD pixel data) located on the periphery of the target position in the HD signal (1050i signal) is selectively extracted from the SD signal (525i signal). The resultant space class tap data is supplied to the space class detection circuit 157. In the space class detection circuit 157, each SD pixel data as the space class tap data is subjected to ADRC processing so that a re-quantized code qi as class information of the space class (a class sort mainly for the purpose of expressing the waveform in a space) can be produced (see the Equation (1)).

In addition, in the third tap selection circuit 155, movement class tap data (SD pixel data) located on periphery of the target position in the HD signal is selectively extracted. Thus-obtained movement class tap data is supplied to the movement class detection circuit 158. In the movement class detection circuit 158, class information MV about a movement class (a class sort mainly for the purpose of expressing the degree of movement) is obtained from each SD pixel data as movement class tap data.

Thus-obtained movement information MV and the aforementioned re-quantized code qi are supplied to the class synthesis circuit 159. In the class synthesis circuit 159, the class code CL showing a class including pixel data at the target position in the HD signal (1050i signal) is obtained from the movement information MV and the re-quantized code qi (see the Equation (3)).

Further, in the first tap selection circuit 153, the prediction tap data (SD pixel data) located on periphery of the target position in the HD signal is selectively extracted from the SD signals produced in the SD signal production circuit 152. In the normal equation production section 160, a normal equation (see the Equation (13)) to be employed for obtaining the coefficient seed data $w_{1,0}$ to $W_{n,14}$ is produced for each class, from each HD pixel data y as pixel data at the target position obtained from the HD signal received at the input terminal 151, prediction tap data (SD pixel data ) xi selectively extracted in the first tap selection circuit 153 respectively in correspondence with each HD pixel data y, the class code CL received from the class synthesis circuit 159 respectively in correspondence with each HD pixel data y, and the parameters h, v.

Then, the normal equation is solved in the coefficient seed data decision section 161 so that the coefficient seed data $w_{1,0}$ to $W_{n,14}$ for each class can be obtained. Thus-obtained coefficient seed data $w_{1,0}$ to $W_{n,14}$ is stored in the coefficient seed memory 162 in which addresses are assigned for each class.

In the normal equation production section 160, the learning data produced in combination of the HD pixel data y and the prediction tap pixel data in the number of n corresponding to the HD pixel data y is distinguished according to the information indicating that whether the HD pixel data y is derived from a HD signal in an odd field or a HD signal in an even field, and also that the HD pixel data y corresponds to which one of four pixels within the pixel block in the unit of 2×2 described above constituting this HD signal. In this manner, a normal equation (see the Equation (13)) for obtaining the coefficient seed data $w_{1,0}$ to $W_{n,14}$ corresponding to four pixels within the pixel block in the unit of 2×2 constituting the HD signal (1050i signal) in the respective odd and even fields can be independently produced.

As a result, in the coefficient seed data decision section, it becomes possible to obtain the coefficient seed data $w_{1,0}$ to $W_{n,14}$ corresponding to four pixels within the pixel block in the unit of 2×2 constituting the HD signal (1050i signal) in the respective odd and even fields, so that they are stored in the coefficient seed memory 162.

The above description has showed an example where the coefficient seed data $w_{i0}$ to $w_{i,14}$ (i=1 to n), which is coefficient data in the basic production equation in the Equation (5), is obtained. In the same manner as the above, it is possible to obtain coefficient seed data, which is coefficient data in the production equation constituted by the selected terms (for example, constituted by 10 terms at the maximum) from the terms constituting this basic production equation.

Next, an example of a method for producing term selection information will be described.

As described above, among the terms constituting the basic production equation, a predetermined term is selected to produce a candidate production equation. By use of thus-produced candidate production equation, coefficient seed data in each class is obtained according to the aforementioned method for producing the coefficient seed data. Then, by use of the coefficient seed data in each class, the coefficient data Wi (i=1 to n) of the estimated equation in each class is produced. The same processing as that performed in the image signal processing section 110 shown in FIG. 1 is repeated so that the HD signal (1050i signal) can be produced from the SD signals (525i signal) as a student signal. The pixel data of thus-produced HD signal and the pixel data of the HD signal before the student signal SD is produced are classified per class, and a sum of the differences in the respective corresponding pixel data is obtained so as to be error information.

The aforementioned processing is repeatedly performed on a plurality of candidate production equations having the selected term sequentially changed. As a result, a candidate production equation in which the error information is at the lowest value is determined for each class. Due to this, the term selection information $SL_0$ to $SL_9$ in each class, which is stored into the information memory bank 135 in the image signal processing section 110 shown in FIG. 1, selects the term corresponding to the candidate production equation in which the error information is at the lowest value, from the terms constituting the basic production equation. In addition, the coefficient seed data $A_{i0}$ to $A_{i9}$ in each class, which is stored into the information memory bank 135 in the image signal processing section 110 shown in FIG. 1, is made into coefficient seed data obtained using the candidate production equation in which the error information is at the lowest value.

In the image signal processing section 110 shown in FIG. 1, the term in the production equation for each class is selected using term selection information $SL_0$ to $SL_9$ stored in the information memory bank 135 beforehand. Alternatively, the term selection information may be obtained and used every time when it is required, based on the class code CL obtained from the class synthesis circuit 126, for example. Further, in the image signal processing section 110 shown in FIG. 1, the class including the pixel data at the target position in the HD signal is used as a feature amount obtained in relation to the SD signal (525i signal); however, it is not limited thereto.

Further, in the image signal processing section 110, the Equation (5) is employed as the basic production equation for producing the coefficient data Wi (i=1 to n). Alternatively, the present invention can be implemented by use of polynomial equation in another order or an equation expressed by another function.

Further, in the image signal processing section 110 shown in FIG. 1, the parameter h for specifying the horizontal resolution and the parameter v for specifying the vertical resolution are set, and the horizontal and vertical resolutions of the image can be adjusted by adjusting the values of these parameters h, v. Alternatively, it is also possible to constitute a structure in which a parameter z for specifying a degree of removing noise (a degree of lowering noise) is determined for example, and the degree of removing noise from the image can be adjusted by adjusting the value of this parameter z.

Further, although not described above, when an input image signal Vin is converted into an output image signal Vout for obtaining images of various magnifications, the phase (position) of the pixel constituting the output image signal Vout is converted by the magnifications. In this case, it is conceivable to produce the coefficient data Wi of the estimated equation for obtaining an pixel at each phase according to the production equation, which uses the phase information of the pixel as a parameter, by use of the coefficient seed data. In this case, as in the same manner as described above, it is possible to select the terms for the production equation in each class, thereby obtaining the same effect as that of the embodiment described above.

Figure 12:
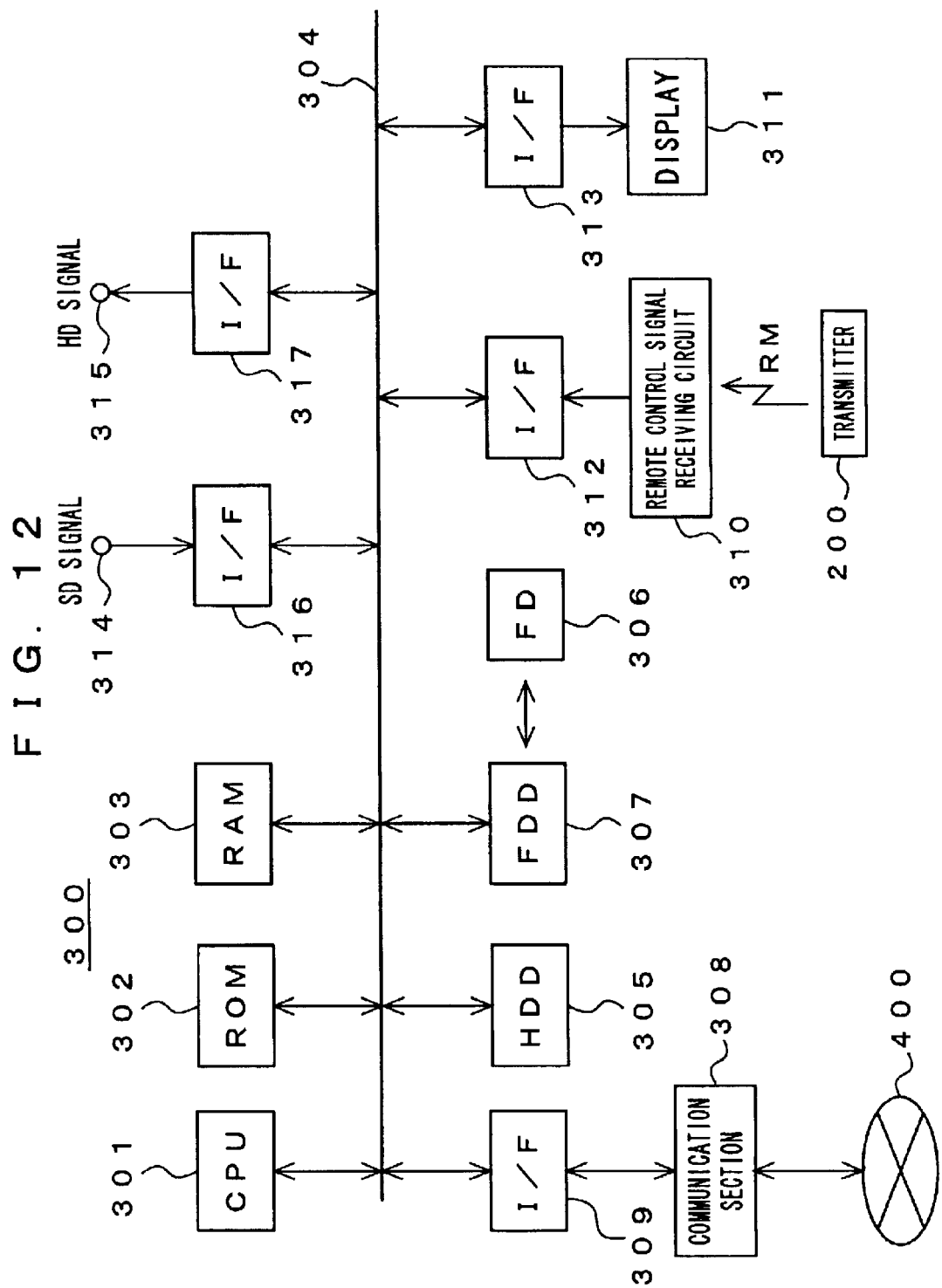
FIG. 12 is a block diagram showing an exemplary configuration of an image signal processor for materializing with software.

In addition, the processing performed in the image signal processing section 110 shown in FIG. 1 can be implemented in software, by use of an image signal processor such as the image signal processor 300 as shown in FIG. 12.

First, the image signal processor 300 shown in FIG. 12 will be described. The image signal processor 300 comprises a CPU 301 for controlling operations of the entire apparatus, a ROM (Read Only Memory) 302 for storing an operation program for the CPU 301, coefficient seed data, term selection information and the like, and a RAM (Random Access Memory) 303 for organizing a working area for the CPU 301. The CPU 301, ROM 302 and RAM 303 are connected to a bus 304, respectively.

The image signal processor 300 also comprises a hard disc drive (HDD) 305 as an external storage apparatus, and a disc drive (FDD) 307 for driving a Floppy (Trade Name) disc 306. These drives 305, 307 are connected to the bus 304, respectively.

The image signal processor 300 also comprises a communication section 308 for connecting to a communication network 400 such as the Internet through wired transmission or radio transmission. The communication section 308 is connected to the bus 304 via an interface 309.

The image signal processor 300 also comprises a user interface section. The user interface section includes a remote control signal receiving circuit 310 for receiving a remote control signal RM from a remote control transmitter 200, and a display 311 constituted by a liquid crystal display (LCD) and the like. The receiving circuit 310 is connected to the bus 304 via an interface 312, and similarly, the display 311 is connected to the bus 304 via the interface 313.

The image signal processor 300 also comprises an input terminal 314 for receiving the SD signal, and an output terminal 315 for transmitting the HD signal. The input terminal 314 is connected to the bus 304 via an interface 316, and similarly, the output terminal 315 is connected to the bus 304 via an interface 317.

The processing program, the coefficient seed data, the term selection information and the like may be, instead of stored into the ROM 302 beforehand as described above, downloaded from the communication network 400 such as the Internet via the communication section 308 so as to be stored into the hard disc or the RAM 303, and then be used. Further, the processing program, the coefficient seed data, the term selection information and the like may be provided in the state of being stored in a Floppy (Trade Name) disc 306.

Further, the SD signal to be processed may be, instead of being received through the input terminal 314, recorded in a hard disc beforehand, or may be downloaded from the communication network 400 such as the Internet via the communication section 308. In addition, the processed HD signal may be, instead of or at the same time of being transmitted through the output terminal 315, supplied to the display 311 so as to display an image. Alternatively, the processed HD signal may be stored in a hard disc, or may be transmitted to the communication network 400 such as the Internet via the communication section 308.

Referring to a flow chart of FIG. 13, a processing procedure for obtaining a HD signal from a SD signal in the image signal processor 300 shown in FIG. 12 will be described.

First, a processing starts in Step ST1. Then, in Step ST2, SD pixel data is input in the unit of frame or in the unit of field. If the SD pixel data is input through the input terminal 314, the RAM 303 temporality stores the SD pixel data. If the SD pixel data is recorded into the hard disc, the SD pixel data is read out of the hard disc drive 307 and then is temporarily stored into the RAM 303. Then, in Step ST3, it is judged whether or not the processing of the input SD pixel data is finished for all frames or all fields. If the processing is finished, then the processing finishes in Step ST4. Contrarily, if the processing is not finished yet, then the procedure goes to Step ST5.

In Step ST5, values for specifying an image (for example, the values of the parameters h, v) which the user has selected through operating the remote control transmitter 200, are read from the RAM 303 for example. Then, in Step ST6, coefficient data Wi of the estimated equation (see the Equation (4)) in each class is produced according to the production equation constituted by the term selected by the term selection information using the read image specifying values and the coefficient seed data in each class.

Next, in Step ST7, class tap data and prediction tap pixel data are obtained from the SD pixel data input in Step ST2, in correspondence with each HD pixel data to be produced. Then, in Step ST8, it is judged whether or not the processing for obtaining HD pixel data finishes in all the areas of the input SD pixel data. If the processing finishes, then the procedure returns to Step ST2 where the procedure goes to a processing of inputting SD pixel data in the next frame or field. Contrarily, if the processing has not yet finished, then the procedure goes to Step ST9.

In Step ST9, a class code CL is produced from the SD pixel data of the class tap obtained in Step ST7. Then, in Step ST10, HD pixel data is produced according to the estimated equation using the coefficient data corresponding to the produced class code CL and the SD pixel data of the prediction tap. After that, the procedure returns to Step ST7 where the same processing as described above is repeated.

Figure 13:
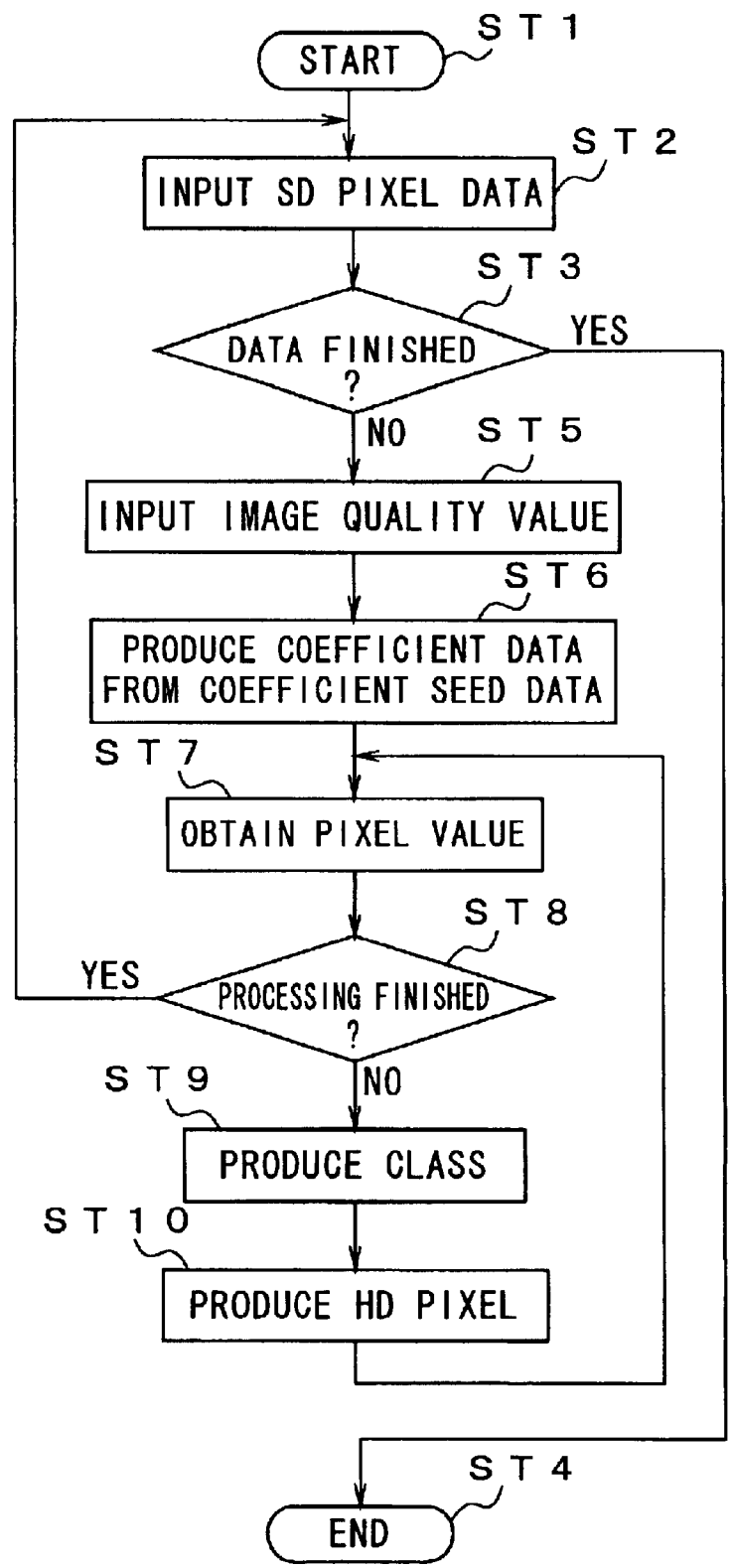
FIG. 13 is a flow chart showing the procedure for processing the image signal.

In the manner as described above, the SD pixel data, which constitutes the input SD signal, is processed by performing the processing in accordance with the flow chart shown in FIG. 13 so that the HD pixel data, which constitutes the HD signal, can be obtained. As described above, the HD signal obtained as a result of the processing is transmitted to the output terminal 315, or is supplied to the display 311 to display an image produced thereby. Alternatively, the HD signal is supplied to the hard disc drive 305 to be recorded in the hard disc.

In the embodiment described above, a linear one-dimentional equation is employed as the estimated equation for producing the HD signal; however, the present invention is not limited thereto. Alternatively, a high order polynomial equation may be employed as the estimated equation.

Further, the embodiment described above has showed an example where the SD signal (525i signal) is converted into the HD signal (1050i signal). However, the present invention is not limited thereto. It is a matter of course that the preset invention is similarly applicable to another case where a first image signal is converted into a second image signal by use of an estimated equation.

Further, the embodiment described above has showed and example where the information signal is an image signal; however, the present invention is not limited thereto. For example, the present invention is also applicable to a case where the information signal is a sound signal.

According to the present invention, when the coefficient data of the estimated equation to be used at the time when the first information signal is converted into the second information signal is produced using the coefficient seed data, the term of the production equation is selected, based on the feature amount obtained in relation to the first information signal. In this manner, it becomes possible to compress the sizes of the coefficient seed data and the calculator without lowering the accuracy of operation, as well as to increase the approximate accuracy of the coefficient curved surface.

INDUSTRIAL APPLICABILITY

As described above, the information signal processor, the method for processing an information signal, an image signal processor and an image display apparatus using the same, and an information-providing medium according to the present invention are preferable for use in the case where the signal format is converted from the SD signal to the HD signal, for example.

What is claimed is:

1. An information signal processor for converting a first information signal including a plurality of information data into a second information signal including a plurality of information data, comprising:
    parameter setting means for setting a value of parameter related to the second information signal;
    first memory means for storing coefficient seed data, said coefficient seed data being coefficient data in production equation for producing coefficient data to be used in an estimated equation and said production equation containing said parameter;
    term selection means for selecting at least a term of said production equation, based on a feature obtained in relation to said first information signal;
    coefficient data generation means for generating said coefficient data to be used in said estimated equation corresponding to the set parameter, said coefficient data in the estimated equation being produced according to the term-selected production equation from said term selection means using said coefficient seed data stored in said first memory means and a value of said parameter set by said parameter setting means;
    first data selection means for selecting a plurality of first information data from said first information signal located on the periphery of a target position in said second information signal; and
    calculation means for calculating and obtaining information data at said target position according to said estimated equation using said coefficient data generated in said coefficient data generation means and the plurality of said first information data selected in said first data selection means.

2. The information signal processor according to claim 1, further comprising:
    second data selection means for selecting a plurality of second information data from said first information signal located on the periphery of a target position in said second information signal; and
    class detection means for detecting a class for said information data at said target position, based on the plurality of said second information data selected in said second data selection means,
    wherein the first memory means stores said coefficient seed data obtained beforehand per class detected in said class detection means, and
    wherein the coefficient data generation means generates coefficient data of said estimated equation corresponding to said class detected in said class detection means and said value of parameter set in said parameter setting means.

3. The information signal processor according to claim 2, wherein the coefficient data generation means comprises:
    coefficient data production means for producing coefficient data of said estimated equation per class detected in said class detection means according to the production equation including the term selected in said term selection means, using said coefficient seed data stored in said first memory means and the value of said parameter set in said parameter setting means;
    second memory means for storing the coefficient data of said estimated equation in each class produced in said coefficient data production means; and
    coefficient data read means for reading out of said second memory means the coefficient data of said estimated equation corresponding to the class detected by the class detection means.

4. The information signal processor according to claim 1, further comprising:
    addition means for obtaining a sum of the coefficient data of said estimated equation generated in said coefficient data generation means; and
    normalization means for normalizing with dividing the information data at said target position obtained in said calculation means by the sum obtained in said addition means.

5. The information signal processor according to claim 2, wherein the feature obtained in relation to said first information signal is a class detected in said class detection means.

6. The information signal processor according to claim 1, wherein the term selection means comprises information obtaining means for obtaining term selection information from the feature,
wherein the term selection means selects the term of said production equation using the term selection information obtained in said information obtaining means.

7. The information signal processor according to claim 6, wherein said information obtaining means is constituted by a ROM table.

8. An image signal processor for converting a first image signal including a plurality of pixel data into a second image signal including a plurality of pixel data, comprising:
parameter setting means for setting a value of parameter related to said second image signal;
memory means for storing coefficient seed data, said coefficient seed data being coefficient data in production equation for producing coefficient data to be used in an estimated equation, and said production equation containing said parameter;
term selection means for selecting at least a term of said production equation, based on a feature obtained in relation to said first image signal;
coefficient data generation means for generating the coefficient data to be used in said estimated equation corresponding to said set parameter, said coefficient data in said estimated equation being produced according to said production equation using the coefficient seed data stored in said memory means and a value of said parameter set by said parameter setting means, said production equation containing the term selected by said term selection means;
data selection means for selecting a plurality of pixel data from said first image signal located on the periphery of a target position in said second image signal; and
calculation means for calculating and obtaining pixel data at said target position according to said estimated equation using said coefficient data generated in said coefficient data generation means and the plurality of said pixel data selected in said data selection means.

9. An image display apparatus comprising:
image signal input means for inputting a first image signal including a plurality of pixel data;
image signal processing means for converting the first image signal input by the image signal input means into a second image signal including a plurality of pixel data;
image display means for displaying an image based on the second image signal from said image signal processing means onto an image display element; and
parameter setting means for setting a value of parameter relates to said second image signal,
wherein the image signal processing means comprises:
first memory means for storing coefficient seed data, said coefficient seed data being coefficient data in production equation for producing coefficient data to be used in an estimated equation, and said production equation containing said parameter;
term selection means for selecting at least a term of said production equation, based on a feature obtained in relation to said first image signal;
coefficient data generation means for generating the coefficient data to be used in said estimated equation corresponding to said set parameter, said coefficient data in the estimated equation being produced according to the production equation using said coefficient seed data stored in said first memory means and a value of said parameter set by said parameter setting means, and said production equation containing the term selected in the term selection means;
first data selection means for selecting a plurality of first pixel data from said first image signal located on the periphery of a target position in said second image signal; and
calculation means for calculating and obtaining pixel data at said target position according to said estimated equation using said coefficient data generated in said coefficient data generation means and the plurality of said pixel data selected in said first data selection means.

10. The image display apparatus according to claim 9, further comprising:
second data selection means for selecting a plurality of second pixel data located on the periphery of a target position in said second image signal, based on said first information signal; and
class detection means for detecting a class for the pixel data at said target position, based on the plurality of said second pixel data selected in said second data selection means,
wherein said first memory means stores said coefficient seed data obtained beforehand per class detected in the class detection means, and
wherein said coefficient data generation means generates coefficient data of said estimated equation corresponding to the class detected in said class detection means and the value of said parameter set in said parameter setting means.

11. The image display apparatus according to claim 10, wherein the coefficient data generation means comprises:
coefficient data production means for producing coefficient data of said estimated equation for each class detected in said class detection means according to the term-selected production equation from said term selection means using the coefficient seed data stored in said first memory means and the value of said parameter set in said parameter setting means;
second memory means for storing the coefficient data of said estimated equation in each class produced in said coefficient data production means;
coefficient data read means for reading out of said second memory means the coefficient data of said estimated equation corresponding to the class detected by said class detection means.

12. The image display apparatus according to claim 9, further comprising:
addition means for obtaining a sum of the coefficient data of said estimated equation generated in said coefficient data generation means; and
normalization means for normalizing with dividing the pixel data at said target position obtained in said calculation means by the sum obtained in said addition means.

13. The image display apparatus according to claim 10, wherein the feature obtained in relation to said first image signal is a class detected in said class detection means.

14. The image display apparatus according to claim 9,
wherein said term selection means comprises information obtaining means for obtaining term selection information from said feature amount, and
wherein said term selection means selects the term of said production equation using the term selection information obtained in said information obtaining means.

15. The image display apparatus according to claim 14, wherein said information obtaining means is constituted by a ROM table.

16. A method for processing an information signal for converting a first information signal including a plurality of information data into a second information signal including a plurality of information data, comprising:
a first step of setting a value of parameter related to said second information signal;
a second step of selecting a term of a production equation for producing coefficient data to be used in an estimated equation, said production equation including said parameter;
a third step of generating coefficient data to be used in said estimated equation corresponding to the value of said set parameter, said coefficient data to be used in said estimated equation being produced according to the production equation using the coefficient seed data, said coefficient seed data being coefficient data in said production equation, and the value of said parameter set in the first step, said production equation containing the term selected in the second step;
a fourth step of selecting a plurality of first information data from said first information signal located on the periphery of a target position in said second information signal; and
a fifth step of calculating and obtaining information data at said target position according to said estimated equation using said coefficient data generated in the third step and said plurality of said first information data selected in the fourth step.

17. The method for processing an information signal according to claim 16, further comprising the steps of:
a sixth step of selecting a plurality of second information data from said first informatin signal located on the periphery of a target position in said second information signal; and
a seventh step of detecting a class for the information data at said target position, based on the plurality of said second information data selected in the sixth step,
wherein in the third step, coefficient data of said estimated equation corresponding to the class detected in the seventh step and the value of said parameter set in the first step is generated.

18. The method for processing an information signal according to claim 17, wherein the third step further includes:
a step of producing coefficient data of said estimated equation per class according to said production equation using said coefficient seed data per class detected in the seventh step and the value of said parameter set in the first step, said production equation containing the term selected in the second step;
a step of storing the produced coefficient data of said estimated equation in each class into a memory means; and
a step of reading the coefficient data of said estimated equation corresponding to the class detected in the seventh step out of the memory means.

19. The method for processing an information signal according to claim 16, further comprising:
a step of obtaining a sum of coefficient data of said estimated equation generated in the third step; and
a step of normalizing with dividing the information data at said target position obtained in the fifth step by the sum obtained in the last-mentioned step.

20. The method for processing an information signal according to claim 17,
wherein the feature obtained in relation to said first information signal is a class detected in the seventh step.

21. The method for processing an information signal according to claim 16,
wherein in the second step, term selection information is obtained from said feature, and the term of said production equation is selected by use of the term selection information.

22. The method for processing an information signal according to claim 21,
wherein in the second step, the term selection information is obtained by use of a ROM table.

23. An information-providing medium for providing a computer program for, in order to convert a first information signal including a plurality of information data into a second information signal including a plurality of information data, executing the steps of:
a first step of setting a value of parameter related to said second information signal;
a second step of selecting a term of a production equation for producing coefficient data to be used in an estimated equation, said production equation including sad parameter;
a third step of generating coefficient data to be used in said estimated equation corresponding to the value of said set parameter, said coefficient data to be used in said estimated equation being produced according to the production equation using the coefficient seed data, said coefficient seed data being coefficient data in said production equation, and the value of said parameter set in the first step, said production equation containing the term selected in the second step;
a fourth step of selecting a plurality of first information data located on the periphery of a target position in said second information signal, based on said first information signal; and
a fifth step of calculating and obtaining information data at said target position according to said estimated equation using said coefficient data generated in the third step and said plurality of said first information data selected in the fourth step.

* * * * *